United States Patent
Poustie et al.

(10) Patent No.: US 6,452,704 B1
(45) Date of Patent: Sep. 17, 2002

(54) METHOD OF OBTAINING AN OPTICAL SIGNAL STREAM

(75) Inventors: Alistair James Poustie, Ipswich; Keith James Blow, Woodbridge; Robert John Manning, Ipswich, all of (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 09/180,299

(22) PCT Filed: Sep. 10, 1998

(86) PCT No.: PCT/GB98/02731

§ 371 (c)(1),
(2), (4) Date: Nov. 5, 1998

(87) PCT Pub. No.: WO99/14649

PCT Pub. Date: Mar. 25, 1999

(30) Foreign Application Priority Data

Sep. 18, 1997  (GB) .............................. 9719895

(51) Int. Cl.$^7$ ............................... H04J 14/08
(52) U.S. Cl. ..................................... 359/139
(58) Field of Search ................. 359/135, 138, 359/139, 140

(56) References Cited

U.S. PATENT DOCUMENTS

| | | | | |
|---|---|---|---|---|
| 4,900,115 A | | 2/1990 | Heuring et al. | 350/96.15 |
| 5,197,097 A | * | 3/1993 | Takahashi et al. | 380/6 |
| 5,446,571 A | | 8/1995 | Shabeer | 359/107 |
| 5,450,225 A | * | 9/1995 | Bostica et al. | 359/139 |
| 5,796,765 A | * | 8/1998 | Lucek et al. | 372/25 |

FOREIGN PATENT DOCUMENTS

| | | |
|---|---|---|
| WO | WO 94 21088 | 9/1994 |
| WO | WO 95 10870 | 4/1995 |
| WO | WO 95 33324 | 12/1995 |

OTHER PUBLICATIONS

Tetsuhiko Ikegami et al.: "Nonlinear Optical Devices for Switching Applications" International Conference on Communications, Including Supercomm Technical Sessions. Atlanta, Apr. 15–19, 1990, vol. vol. 3, Apr. 15, 1990, pp. 1152–1156, XP000146003, Institute of Electrical And Electronics Engineers.

Hinton H S: "Architectural Considerations for Photonic Switching Networks" IEEE Journal on Selected Areas in Communications, vol. 6 No. 7, Aug. 1, 1998, pp. 1209–1226, XP000068606, p. 1219, left–hand col., line 33, p. 1219, right–hand col., line 13.

Matsumoto T et al: "Studies on Optical Digital Cross–Connect Systems for Very–High–Speed Optical Communications Networks", Serving Humanity Through Communication, Supercomm/Icc, New Orleans, May 1–5, 1994, col. 3, pp. 1060–1065, XP000438664 Institute of Electrical and Electronics Engineers.

Jinno M, et al. "Ultrafst All–Optical Logic Operations in a Nonlinear Sagnac Interferometer with Two Pump Pulses" Proceedings of the Optical Fiber Communication Conference, San Diego, Feb. 18–22, 1991, no. Conf. 14, p. 48, XP000270349, Institute of Electrical and Electronics Engineers, pp. 1063, right–hand col., lines 1–6; figure 6.

* cited by examiner

Primary Examiner—Leslie Pascal
Assistant Examiner—Dalzid Singh
(74) Attorney, Agent, or Firm—Nixon & Vanderhye PC

(57) ABSTRACT

The present invention relates to a method and apparatus for generating an optical bit slot window in which N bit slots having the same logical state are generated. A switching device is used which is coupled to an optical pulse source which generates optical pulses in successive bit slots, each optical pulse representing a logical state. Switching signals are then applied to a switching input of the switching device so as to selectively switch a connection between the input and an output. Consequently the logical state of the output is controlled to generate the required N bit slot window.

48 Claims, 8 Drawing Sheets

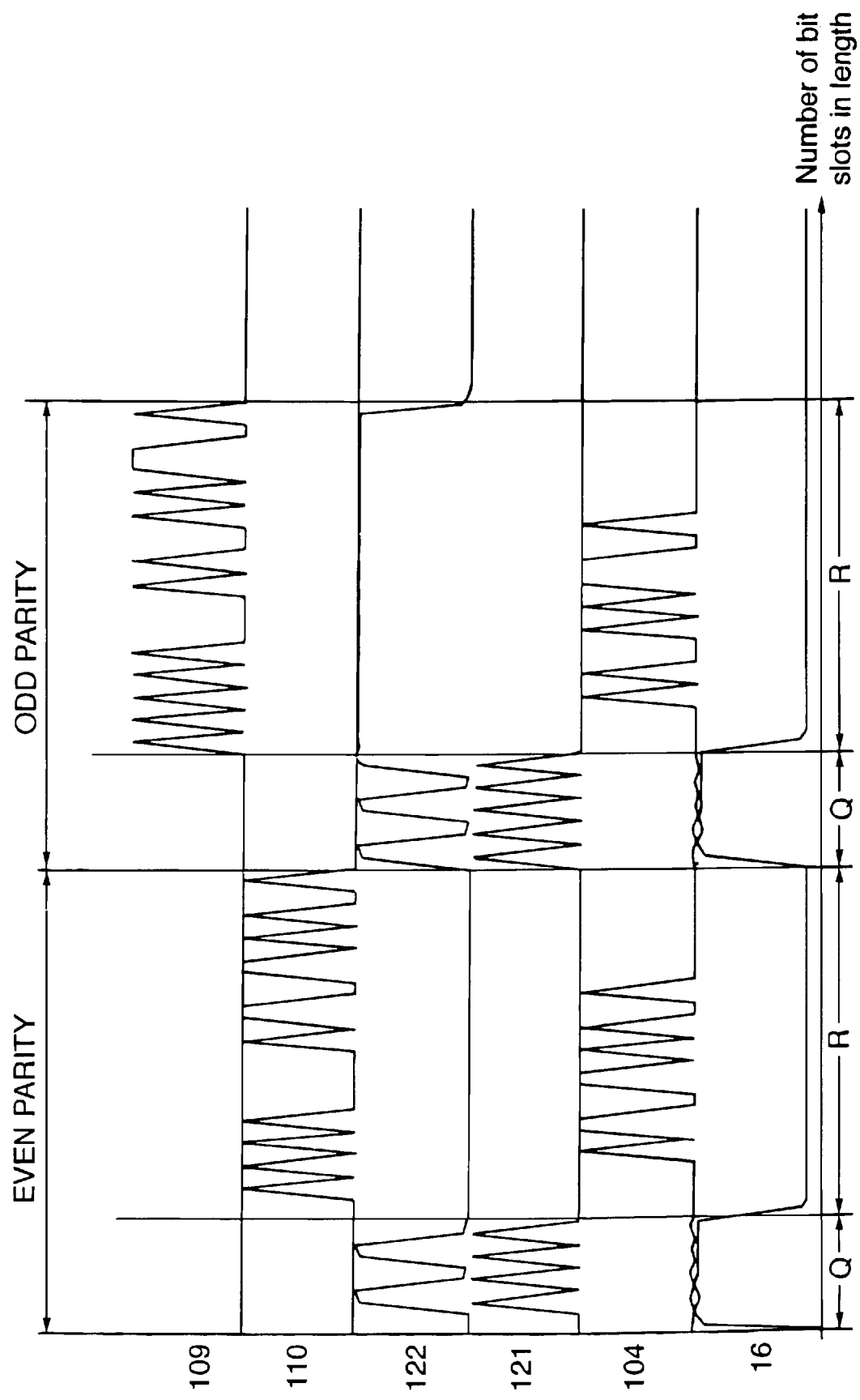

METHOD OF OBTAINING AN OPTICAL SIGNAL STREAM

BACKGROUND AND SUMMARY OF THE INVENTION

The present invention relates to a method and apparatus for generating an optical bit slot window comprising N bit slots, all the N bit slots representing the same logical state, and uses thereof.

In the field of all optical processing, optical signal streams are used for data processing applications. These optical streams consist of an optical pulse train that is divided into a series of bit slots. Each bit slot, which has a predetermined length within the pulse train, represents a single bit of data, with the presence or absence of an optical pulse within a bit slot representing complementary logical states. Thus, for example, the presence of a pulse may represent a binary "1", whilst the absence of an optical pulse may represent a binary "0", or vice versa.

It has long been a goal to produce devices capable of carrying out all optical processing. In order to achieve such devices, it is necessary to produce, using only optical manipulations, optical signal streams with certain predefined characteristics. One such signal stream that is required for many applications is a window which comprises an optical stream with a predetermined number of bit slots all having the same logical state so as to represent a predetermined number of binary "1"s, or "0"s, in sequence.

According to a first aspect of the present invention, we provide a method of generating an optical bit sloth window comprising N bit slots, all the N bit slots representing the same logical state, using an all-optical switching device, the switching device having an input coupled to an optical pulse source which generates optical pulses in successive bit slots, each optical pulse representing a logical state, an output which generates an output stream defining the bit slot window, and a switching input coupled to a source of optical switching signals, wherein the application of switching signals to the switching input selectively switches a connection between the input and the output so as to change the logical state of the output, the method comprising applying a first switching signal to the switching input and, after a time interval corresponding to N bit slots, applying a second switching signal to the switching input.

According to a second aspect of the present invention, we provide apparatus for generating an optical bit slot window comprising N bit slots, all the N bit slots representing the same logical state, the apparatus comprising an optical pulse source which generates optical pulses in successive bit slots, each optical pulse representing a logical state; a source of switching signals which generates first and second switching signals separated by a time interval corresponding to N bit slots; and, a switching device, the switching device comprising a switching input coupled to the source of switching signals, an output which generates an output stream defining the bit slot window, and an input, coupled to the optical pulse source, wherein the application of switching signals to the switching input selectively switches a connection between the input and the output so as to change the logical state of the output.

We have designed a method and apparatus for generating an optical bit slot window comprising N bit slots, all the N bit slots representing the same logical state, thus providing a sequence of bit slots representing a predetermined number of binary "1"s, or "0"s, in sequencers The apparatus comprises an optical switching device to which is input a continuous stream of optical pulses. By applying switching signals to the switching input of the switching device, a connection between the input and the output of the switching device can be opened or closed, allowing the transfer of optical pulses from the input to the switching device output to be controlled.

These optical pulses are used to generate an output stream and, as the presence or absence of an optical pulse represents complementary logical states, the logical state of the output stream can be controlled by controlling the transfer of the optical pulses to the output of the switching device.

As the application of a switching signal causes the connection to switch from open to closed, or vice versa, by applying two switching signals separated by a predetermined time interval corresponding to N bit slots, the output stream will represent one logical state for N bit slots and the complementary logical state outside the N bit slots.

Typically the source for generating optical switching signals comprises a source for generating a single optical switching signal; a delay line; and, an optical combiner, the optical combiner comprising first and second combiner inputs coupled to the single optical switching signal source and a combiner output, wherein the first combiner input is connected to the single optical switching signal source via the delay line such that the single optical switching signal is input to the first and second combiner inputs separated by a time interval corresponding to N bit slots such that first and second optical switching signals are output from the combiner output separated by N bit slots. This allows the predetermined number of bit slots to be altered by altering the time interval introduced by the delay line.

Preferably each switching signal comprises a single optical pulse in a bit slot, although a bit slot containing no optical pulse could be used, situated within a streamed bit slots containing optical pulses.

Typically the switching device comprises an all-optical non-linear gate, the non-linear gate comprising a gate input coupled to the switching device input; a gate output which generates a gate output stream; a gate switching input coupled to the switching device switching input, wherein the application of a switching signal to the gate switching input selectively switches a connection between the gate input and the gate output so as to change the logical state of the gate output stream for a time interval corresponding to a single bit slot; and, a feedback loop with a single bit slot delay for feeding back N bit slots of the gate output stream to the gate switching input to maintain the logical state of the gate output stream. Whilst any form of switching device may be used, an all-optical non-linear gate is preferable as it is compact and easy to use whilst still providing all optical operation with fast switching properties.

Typically the switching device further comprises an optical combiner, the optical combiner comprising a first combiner input coupled to the switching device switching input; a second combiner input coupled to the gate output via the feedback loop; and, a combiner output connected to the gate switching input, wherein if a bit slot having the same logical state as the switching signal, and a switching signal are received at the first and second combiner inputs at substantially the same time, then no switching signal is output from the combiner output. This allows the gate output stream to be fed back as a switching signal without there being problems of interferometric mixing of the switching signal and the output stream.

It will be realised that provision of no switching signal upon the reception of a switching signal and a bit slot having the same logical state may be achieved by simply ensuring there is no output from the combiner. However, preferably this is achieved by ensuring that any output from the combiner is not detectable as a switching signal, i.e. it is of a different format.

Typically, each of the N fed back bit slots in the gate output stream preferably comprise a single optical pulse in a bit slot. Although again a bit slot containing no optical pulse could be used.

Typically, the gate output is coupled to the switching device output such that each of the N optical bit slots contains an optical pulse. Alternatively however, the optical gate may further comprise a second gate output which generates a second gate output stream which is the logical complement of the gate output stream. In this case, the second gate output may be coupled to the switching device output such that each of the N optical bit slots contains no optical pulse.

Preferably the first and second switching signals are generated by generating a first switching signal; copying the first switching signal to generate a second switching signal; transferring the first switching signal to the switching input of the switching device; and, after a time interval corresponding to N bit slots, transferring the second switching signal to the switching input of the switching device. This allows the number of bit slots representing the same logical state to be quickly and easily altered by controlling the length of the time interval.

Typically each switching signal comprises a single optical pulse in a bit slot.

Typically the switching device includes an all-optical non-linear gate, the gate having a gate input coupled to the switching device input, a gate output which generates a gate output stream, and a gate switching input coupled to the switching device input, wherein the application of a switching signal to the switching input selectively switches a connection between the gate input and the gate output so as to change the logical state of the gate output stream for a time interval corresponding to a single bit slot. In such a case, the method preferably involves applying the first switching signal to the gate switching input to change the logical state of the gate output stream for a time interval corresponding to a single bit slot; and, feeding back N bit slots of the gate output stream with a single bit slot delay to the gate switching input to maintain the logical state of the gate output stream. This allows the non-linear gate to be controlled to produce an output stream of N bit slots having the desired logical state.

Preferably, the method further comprises combining the gate output stream and the switching signals prior to input to the gate switching input, such that if a bit slot having the same logical state as the switching signals, and a switching signal are combined, then no switching signal is applied to the gate switching input. This prevents the output stream being maintained in the logical state for longer than N bit slots, however, alternative methods for preventing the gate maintaining the logical state could be used.

Typically the N fed back bit slots in the gate output stream have the same logical state as the switching signals. Alternatively however the N fed back bit slots in the gate output stream have the complementary logical state compared to the switching signals and the logical state of the N fed back bit slots must therefore be inverted before the output stream is fed back to the gate switching input.

Typically each of the N fed back bit slots in the gate output stream comprise a single optical pulse in a bit slot.

In this case the output stream may be obtained from the gate output, such that each of the N optical bit slots contains an optical pulse.

Alternatively however the gate may further comprise a second gate output, the second gate output generating a second gate output stream having a complementary logical state with respect to the first output stream the method further comprising obtaining the output stream from the second gate output such that each of the N optical bit slots contains no optical pulse.

According to a third aspect of the invention, we provide a method of comparing first and second optical binary words, each word being defined as a sequence of M optical bit slots optically representing respective logical states, utilizing an all optical word comparator, the comparator having a first word input, a second word input, an input which receives a stream of optical pulses, and an output, the method comprising receiving the first and second binary words at the first and second word inputs respectively; comparing the respective bit slots of the two binary words; and, selectively switching a connection between the input and the output such that the output indicates the relationship between the two binary words.

According to a fourth aspect of the present invention, we provide an all optical word comparator for comparing first and second optical binary words, each word being defined as a sequence of M optical bit slots optically representing respective logical states, the apparatus comprising a first comparator word input which receives the first binary word; a second comparator word input which receives the second binary word; a comparator input which receives a stream of optical pulses; a comparator output; and a controller coupled to the first and second comparator word inputs, the comparator input and the comparator output, wherein the controller compares respective bit slots of the two binary words and selectively switches a connection between the comparator input and the comparator output such that the output from the comparator output indicates the relationship between the two binary words.

We provide a word comparator and a method of operating the word comparator for comparing two binary words. The word comparator receives the two binary words and compares the respective bit slots of each word such that if any bit slot in one word is different to the respective bit slot in the other word, then the comparator outputs an indication to the effect that the words are not identical.

Typically the method of comparing the words comprises generating a combined optical signal stream by combining respective bit slots of the first and second binary words such that the corresponding bit slot of the combined optical signal stream has a first logical state if the respective bit slots are identical and a second complementary logical state if the respective bit slots are different, and using the logical state of the combined optical signal stream to selectively switch the connection between the comparator input and the comparator output. This simply generates a signal stream which indicates whether each bit slot of one binary word is identical to the corresponding bit slot of the other binary word.

Typically the word comparator further comprises an all optical non-linear gate the gate comprising a gate input, a gate output, which generates a gate output stream, and, a gate switching input, wherein the application of a switching signal to the gate switching input selectively switches the connection between the gate input and the gate output, in which case the method preferably comprises applying the combined optical signal stream to the gate switching input such that the gate selectively switches a connection between the gate input and the gate output so as to change the logical state of the gate output stream. The gate provides a simple way of using the signal stream obtained from the comparator to control the output from the comparator.

Typically applying a switching signal to the gate switching input causes the gate output stream to change from the second logical state to the first logical state for a time period corresponding to one bit slot. Although the switch may be configured to change the output logical state for any period of time.

Typically the switching signal is an optical bit slot having the second logical state, although the bit slots having the first logical state may be used in a suitable switch.

Preferably the word comparator further comprises an optical regenerative memory which stores one optical bit slot representing a logical state, the memory having a memory word input, a memory output, and a memory input, the method further comprising applying the one bit slot to be stored to the memory word input; applying the gate output stream to the memory input; and outputting a copy of the stored bit slot from the memory output.

Preferably the bit slot to be stored has the second logical state and wherein, if the gate output stream contains a bit slot having the first logical state, the memory is reset such that the stored bit slot is replaced by a bit slot having the first logical state. This is a simple method of ensuring that once a single bit slot is discovered that is different for each of the two words, the comparator output will continue to indicate the presence of a difference until the circuit is reset, thereby ensuring that any indication of a difference is not missed.

Typically a bit slot having the second logical state contains a single optical pulse, although any suitable pulse sequence could be used.

Typically the controller further comprises an optical pulse generator the method further comprising applying a single optical pulse to the memory word input to generate the bit slot to be stored.

Typically the comparator of the third aspect of the invention may be reset by generating a stream of optical pulses, wherein the stream of optical pulses defines an optical bit slot window including at least one bit slot containing no optical pulse; and, applying the stream of optical pulses to the word comparator, the presence of the window in the stream of optical pulses causing the word comparator to reset. However any manner of ensuring that the bit slot stored in the memory is replaced by a bit slot containing no optical pulse is suitable.

Preferably however, reset is achieved using a method of generating an optical bit slot window according to the first aspect of the present invention to generate a stream of optical pulses defining an optical bit slot window including at least one bit slot containing no optical pulse, the presence of the bit slot window in the stream of optical pulses causing the word comparator to reset.

Typically the controller according to the fourth aspect of the invention comprises an optical combiner having first and second combiner inputs coupled to the first and the second word inputs respectively, and a combiner output which generates a combined optical signal stream, wherein the combiner combines respective bit slots of the first and second binary words such that the corresponding bit slot of the combined optical signal stream has a first logical state if the respective bit slots are identical and a second complementary logical state if the respective bit slots are different, the logical state of the combined optical signal stream being used to selectively switch the connection between the comparator input and the comparator output.

The controller will generally further comprise an all optical non-linear gate the gate comprising a gate input coupled to the comparator input; a gate output, which generates a gate output stream, coupled to the comparator output; and a gate switching input coupled to the combiner output, wherein the application of a switching signal to the gate switching input selectively switches a connection between the gate input and the gate output so as to change the logical state of the gate output stream.

Typically, in such a switch, the application of a switching signal to the gate switching input causes the gate output stream to change from the second logical state to the first logical state for a time period corresponding to one bit slot.

The controller of such a word comparator will typically further comprise an optical regenerative memory, which stores one optical bit slot representing a logical state, the memory having a memory word input which receives the one bit slot to be stored, a memory output coupled to the comparator output which outputs a copy of the stored bit slot, and a memory input, coupled to the gate output which receives the gate output stream.

The bit slot to be stored in the memory preferably has the second logical state and wherein, if the gate output stream contains a bit slot having the first logical state, the memory is reset such that the stored bit slot is replaced by a bit slot having the first logical state. However any suitable variation may be used.

The word comparator will typically have an optical pulse generator coupled to the memory word input for generating the bit slot to be stored, the bit slot having a single optical pulse.

The word comparator according to the fourth aspect of the invention is preferably reset using a window generator for generating a stream of optical pulses, wherein the stream of optical pulses defines an optical bit slot window including at least one bit slot containing no optical pulse, the presence of the bit slot window in the stream of optical pulses causing the word comparator to reset.

This window generator is preferably the window generator according to the second aspect of the present invention.

According to a fifth aspect of the present invention, we provide a method of separating X sequential bit slots from a binary word having Y bit slots, each bit slot representing a respective logical state, using an all optical non-linear gate having a gate input coupled to an optical pulse source which generates optical pulses in successive bit slots, each optical pulse representing a logical state, a gate output and a gate switching input, wherein the application of the switching signals to the switching input selectively switches a connection between the gate input and the gate output, the method comprising applying the binary word to the gate input; and, applying switching signals to the gate switching input, the switching signals being arranged such that the X sequential bit slots are output from the gate output.

According to a sixth aspect of the present invention, we provide a separating device for separating X sequential bit slots from a binary word having Y bit slots, each bit slot representing a logical state, the apparatus comprising a source of switching signals and an all optical non-linear gate having a gate input which receives a copy of the binary word, a gate output which outputs the X sequential bit slots, and a gate switching input which receives the switching signals from the source of switching signals, wherein the application of the switching signals to the switching input selectively switches a connection between the gate input and the gate output, the switching-signals being arranged such that the X sequential bit slots are output from the gate output.

The separating device operates to separate a predetermined number of bit slots from an optical word by passing the word through a gate and ensuring that the gate redirects the predetermined number of bits to an output, whilst the remainder of the word is either discarded or output from an alternative gate output.

For a separating device of this nature the gate typically has a second gate output, such that applying switching signals to the switching input selectively switches a connection between the gate input and the second gate output.

With two gate outputs, the gate input is preferably connected to one of the first or second gate outputs such that bit slots received by the gate input are output from one of the first and second gate outputs. However an alternative arrangement in which the input is not connected to either output in some circumstances may be used.

Typically applying a single switching signal to the gate switching input selectively switches the connection such that the gate input is connected to the gate output for a time interval corresponding to a single bit slot, although the time interval may be adjusted as required.

Preferably the method further comprises generating an optical signal stream defining an X bit slot window, and applying the signal stream defining the window to the gate switching input such that each of the X bit slots act as a switching signal. This provides an easy method of ensuring the correct number of bit slots are separated from the binary word.

In such a case each bit slot of the X bit slot window contains a single optical pulse.

In order to easily generate the X bit slot window the method according to the first aspect of the invention is usually used. This requires that the number of bit slots N in the bit slot window is equal to the number of bit slots X to be separated from the binary word. Typically this can be done using apparatus according to the second aspect of the invention.

According to a seventh aspect of the invention, we provide a method of determining the parity of a binary word, the binary word being represented by a sequence of Q optical bit slots, each bit slot defining a respective one of first and second complementary logical states, using a switching device, the switching device comprising an input coupled to an optical pulse source which generates optical pulses in successive bit slots, each optical pulse representing a logical state, an output, and a switching input wherein the application of switching signals to the switching input selectively switches a connection between the input and the output so as to change the logical state of the output, the method comprising applying the binary word to the gate switching input such that bit slots having the second complementary state act as switching signals, the parity of the binary word being determined from the final logical state of the output.

According to an eighth aspect of the present invention, we provide parity determining apparatus for determining the parity of a binary word, the binary word being represented by a sequence of Q optical bit slots and each bit slot defining a respective one of first and second complementary logical states, the apparatus comprising an optical pulse source which generates a stream of optical pulses, each optical pulse representing a logical state; and a switching device, the switching device comprising a switching input, an output which generates an output stream defining the bit slot window, and an input, coupled to the optical pulse source, wherein the application of switching signals to the switching input selectively switches a connection between the input and the output so as to change the logical state of the output, and wherein the binary word is applied to the gate switching input such that bit slots having the second complementary state act as switching signals, the parity of the binary word being determined from the final logical state of the output.

Accordingly, we provide a method and apparatus capable of determining the parity of a binary word. The parity is derived from the number of bit slots in the word having one of the two logical states. It is determined by counting the number of bit slots having one of the logical states using a switching device which will change state when a switching signal is applied. The word is then applied to the switching input of the switching device, which is configured such that bit slots having the relevant logical state will act as switching pulses.

Typically the switching device comprises an all-optical non-linear gate, the non-linear gate comprising a gate input coupled to the switching device input; a gate output which generates a gate output stream; a gate switching input coupled to the switching device input, wherein the application of a switching signal to the gate switching input selectively switches a connection between the gate input and the gate output so as to change the logical state of the gate output stream for a time interval corresponding to a single bit slot. For such apparatus the method preferably further comprises feeding back, with a single bit slot delay, any bit slots of the gate output stream, to the gate switching input, such that bit slots with the second logical state act as further switching signals.

Typically the method further comprises combining the gate output stream and the switching signals prior to input to the gate switching input, such that if a bit slot having the same logical state as the switching signals, and a switching signal are combined, then no switching signal is applied to the gate switching input. This ensures that the gate only switches as required.

This combining is achieved using an optical combiner, the optical combiner comprising a first combiner input coupled to the switching device switching input; a second combiner input coupled to the gate output via the feedback loop; and, a combiner output connected to the gate switching input, wherein if a bit slot having the same logical state as the switching signal, and a switching signal are received at the first and second combiner inputs at substantially the same time, then no switching signal is output from the combiner output.

Typically the gate output is coupled to the switching device output.

Preferably each switching signal is an optical bit slot containing a single optical pulse, although a bit slot containing an alternative number of optical pulses may be used.

Typically the apparatus further comprises an all optical non-linear gate having a gate input, first and second gate outputs, a gate switching input coupled to the switching device output, the method comprising applying the output of the switching device to the gate switching input such that the gate input is selectively connected to either the first or the second gate outputs depending on the logical state of the switching device output; and, applying a copy of the binary word to the gate input such that the copy of the binary word is transferred to either the first or second gate outputs in accordance with the logical state of the switching device output. This provides an easy means for controlling the destination of a binary word depending on its parity.

According to a ninth aspect of the present invention we provide a method for controlling the transfer of an optical data packet in accordance with the parity of a packet header, the data packet comprising an R optical bit slot binary word, each of the R bit slots representing a logical state, the method comprising separating the header from the data packet using an optical separating device having an input which receives the data packet and an output which outputs the packet header; determining the parity of the packet header using optical parity determining apparatus having an input, coupled to the output of the separating device to receive the packet header therefrom, and an output which generates an indication of the parity of the packet header; and, using the indication to control the transfer of the data packet.

According to a tenth aspect of the present invention, we provide apparatus for controlling the transfer of an optical data packet in accordance with the parity of a packet header, the data packet comprising a R optical bit slot binary word, each of the R bit slots representing a logical state, the apparatus comprising an optical separating device which separates the header from the data packet, the separating device having an input which receives the data packet and an output which outputs the packet header; and, optical parity determining apparatus which determines the parity of packet header, parity determining apparatus having an input, coupled to the output of the separating device to receive the packet header therefrom, and an output for generating an indication of the parity of the packet header, the indication being used to control the transfer of the data packet.

Accordingly, we provide a method and apparatus for controlling the flow of an optical data packet through a circuit depending on the parity of the packet header. This is achieved by removing the header, determining the parity and then switching the data packet to one of two destinations depending on the parity.

Such a system will generally be used as a way of removing incorrectly addressed data packets from a data network by ensuring that address of only one parity are used. By checking the parity of each data packet in the network, any packets with an incorrect parity will therefore be identified allowing them to be removed from the network.

Typically the method of separating the header from the data packet is a method according to the fifth aspect of the present invention the header comprising X sequential bit slots of the data packet, and wherein the data packet has Y bit slots.

Typically the method of determining the parity of the header is a method according to the seventh aspect of the present invention wherein the Q bit slot binary word whose parity is to be determined is the header.

Typically the separating device is separating a device according to the sixth aspect of the invention wherein the header comprises X sequential bit slots of the data packet, the data packet having Y bit slots.

Typically the parity determining apparatus is parity determining apparatus according to the eighth aspect of the present invention, wherein the Q bit slot binary word whose parity is to be determined is the packet header.

However, it will be realised that any suitable method or apparatus for separating the header or determining the header parity could also be used.

According to an eleventh aspect of the present invention, we provide a method of controlling the destination to which an optical data packet is transferred in accordance with destination information contained within a packet header, the data packet comprising an S bit slot packet header and a T bit slot packet payload, the method comprising separating the header from the data packet, using an optical separating device having an input which receives the data packet and an output which outputs the packet header; comparing the packet header to a predetermined destination address, using an optical word comparator having a first comparator word input connected to the separating device output to receive the packet header therefrom, a second comparator word input which receives the destination address, and an output, which generates an indication of the relationship between the packet header and the address; and, using the indication to control the destination to which the data packet is transferred.

According to a twelfth aspect of the present invention, we provide apparatus for controlling the destination to which an optical data packet is transferred in accordance with destination information contained within a packet header, the data packet comprising an S bit slot packet header and a T bit slot packet payload, the apparatus comprising an optical separating device which separates the header from the data packet, the separating device having an input which receives the data packet and an output which outputs the packet header; an optical word comparator which compares the packet header to a predetermined destination address, the word comparator having a first comparator word input connected to the separating device output to receive the packet header therefrom, a second comparator word input which receives the destination address, and an output, wherein the comparator compares respective bit slots of the header and outputs an indication of the relationship between the header and the destination address; and a switch which receives a copy of the data packet, and which is coupled to the output of the comparator such that the switch controls the destination to which the data packet is transferred in accordance with the indication of the relationship between the header and the destination address.

Accordingly, we provide a method and apparatus for determining the destination to which an optical data packet is transferred by comparing the data packet address to a predetermined address to determine whether these are identical.

Preferably the method of comparing the packet header to the destination address is a method according to the third aspect of the present invention, wherein the first M bit slot binary word is the S bit slot packet header and the second M bit slot binary word is the destination address, although any suitable method could be used.

Typically the method of separating the header from the data packet is a method according to the fifth aspect of the invention, wherein the X sequential bit slots to be separated are the S bit slots of the packet header, the Y bit slot word being the data packet including S bit slot header and the T bit slot payload.

Typically the word comparator is a word comparator according to the fourth aspect of the present invention, wherein the first M bit slot binary word is the S bit slot packet header and the second M bit slot binary word is the destination address.

Furthermore, the separation device is typically a separation device according to the sixth aspect of the present invention, wherein the X sequential bit slots to be removed are the S bit slots of the packet header, the Y bit slot binary word being the data packet including the S bit slot header and the T bit slot payload.

According to the thirteenth aspect of the present invention, we provide a method of resetting an optical regenerative memory, the memory having a word input which receives a binary word to be stored, the binary word comprising L optical bit slots, each bit slot defining a respective one of first and second complementary logical states, an output, an input which receives an optical signal stream, and a regenerative loop, wherein the regenerative loop is coupled to the input such that the application of bit slots having the second logical state to the word input selectively switches a connection between the input and the regenerative loop to cause respective bit slots of the optical signal stream to be transferred to the regenerative loop such that a copy of the word is generated in the loop if the respective bit slots have a second logical state, wherein the loop is further coupled to the output such that the output generates a copy of the binary word and wherein the contents of the loop are regenerated by applying a copy of the output to the word input, the method comprising generating an optical signal stream defining an N bit slot window, each of the N bit slots containing no optical pulses, and applying the optical signal stream to the memory input such that N bit slots contained in the loop are reset to the first logical state.

According to a fourteenth aspect of the present invention, we provide a resettable optical regenerative memory comprising a source for generating an optical signal stream defining an N bit slot window, each of the N bit slots having a first logical state; and a memory, the memory having a word input which receives a binary word to be stored, the binary word comprising L optical bit slots each bit slot defining a respective one of first and second complementary logical states, an output, an input which receives the optical signal stream, and a regenerative loop which is coupled to the input such that the application of bit slots having the second logical state to the word input selectively switches a connection between the input and the regenerative loop to cause respective bit slots of the optical signal stream to be transferred to the regenerative loop such that a copy of the word is generated in the loop if the respective bit slots have a second logical state, wherein the loop is further coupled to the output such that the output generates a copy of the binary word and wherein the contents of the loop are regenerated by applying a copy of the output to the word input, and wherein the reception of the N bit slot window causes the bit slots contained in the loop to be reset to the first logical state.

This aspect of the invention utilises the fact that regenerative type memories need a constant supply of optical pulses to the memory input. By interrupting this pulse supply, the memory will reset.

This in fact applies to other devices which require a constant supply of optical pulses such as the word comparator of the fourth aspect of the invention.

The method of generating an optical signal stream defining an N bit slot window is preferably a method according to the first aspect of the present invention.

Typically the N bit slot window is generated by a window generator according to the first aspect of the present invention.

BRIEF DESCRIPTIONS OF THE DRAWINGS

Some examples of optical circuits according to the present invention and uses thereof will now be described with reference to the accompanying drawings, in which:

FIG. 6b shows time lines indicating the presence of optical pulses at several locations around the packet killer of FIG. 6a;

FIG. 7a shows a schematic representation of a packet receiver utilizing the window generator of FIG. 2; and, FIG. 7b shows time lines indicating the presence of optical pulses at several locations around the packet receiver of FIG. 7a.

DETAILED DESCRIPTION OF THE INVENTION

In order that the invention be understood, certain symbols have been used in the Figures relating to the description. These symbols are shown in FIGS. 1a to 1d and their meanings shall now be discussed.

Figure 1A:
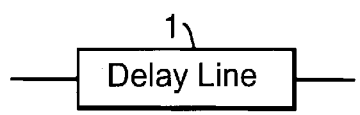
FIG. 1a shows a schematic representation of a delay line.

FIG. 1a shows a delay line 1 which operates to delay the transfer of an optical pulse stream applied at one end of the delay line 1 to the other end, by a predetermined time interval. This time interval usually corresponds to a predetermined number of bit slots. The delay is achieved is using either a length of optical fibre, a silica plane waveguide, or a free space path, or the like, such that the optical pulse takes a predetermined amount of time to travel the length of the element.

The length of delay on a delay line will depend upon the physical length of the waveguide, free space path, or optical fibre used and also the refractive index of the particular transmission media (which will affect the speed of light within the media).

Figure 1B:
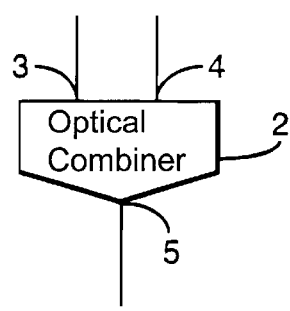
FIG. 1b shows a schematic representation of an optical combiner.

FIG. 1b shows an all optical combiner 2 which has two combiner inputs 3, 4 and a combiner output 5. The combiner 2 combines two optical pulse streams applied to the two combiner inputs 3, 4 in a way that avoids interferometric mixing of pulses.

In practice this is usually achieved by having the pulses of the two different pulse streams arranged at different positions within the respective bit slots, such that the pulses do not overlap in time but are still in the same bit slot. Alternatively however it can be achieved by having orthogonally polarised optical combiner inputs, with the received optical pulse streams having at least some components which will pass through the polarising elements.

As a result of this non-interferometric mixing of pulses, the total optical energy output from the optical combiner during any one bit slot is sum of the total optical energy received.

The optical combiner will usually take the form of an optical fibre coupler, a silica planar waveguide, or a bulk beam splitter.

Figure 1C:
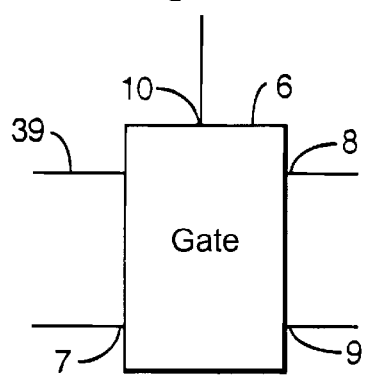
FIG. 1c shows a schematic representation of an all optical non-linear gate.

FIG. 1c shows an all optical non-linear gate 6 which is a form of non-linear optical switching element such as a fibre non-linear optical loop mirror (NOLM), a fibre NOLM with an offset semiconductor amplifier, or an integrated planar NOLM. Mach-Zender, Michaelson and time-division versions of these devices are also possible although will not be considered in detail in the specification. Optical switching elements of this type are generally known as terahertz optical asymmetric demultiplexers (TOADS), and are described in the paper entitled "Asymmetrical Optical Loop Mirror: analysis of an all-optical switch", Applied Optics, Volume 33, No. 29 1994.

The all optical gate has two gate inputs 7, 39, two gate outputs 8, 9 and a gate switching input 10. Each gate input 7, 39 is connected internally to a respective gate output 8, 9, with the connections depending on the state of the switch. Thus, when the gate is in an unswitched state, the gate input 7 is connected to the gate output 9 and gate input 39 is connected to gate output 8. However, when the gate is in a switched state, the gate input 7 is connected to the gate output 8 and the gate input 39 is connected to the gate output 9.

In operation, the state of the switch is controlled by the application of optical pulses to the gate switching input 10. This is achieved using an optical pulse stream comprising a number of bit slots, the stream containing a number of optical pulses. These optical pulses are received by the gate which operates to integrate the total optical energy received over a predetermined time period. From now on, it will be assumed that this time period corresponds to a single bit slot, although in certain circumstances, longer or shorter time periods may be preferable.

Thus, for example, if a single optical pulse has a total energy E, and a bit slot containing a single optical pulse was applied to the gate switching input 10, then a total energy E would be detected. However, if two optical pulses were present within a single bit slot, then the switching input would detect a total energy 2E equivalent to two optical pulses.

The gate has an approximately sinusoidal response to the total amount of energy received during the predetermined time period, such that if the total energy received is an odd integer multiple of the energy contained in one optical pulse, then the switch will enter the switched state so as to transfer any data received at one of the gate inputs 7, 39 to the respective gate output. The gate will return to the unswitched state at the start of the next bit slot. If an even integer multiple is received the switch will remain in the unswitched state.

There is however a limit to the number of optical pulses that can be detected during any one time period. Accordingly, to avoid miscalculation of the number of pulses received, it is preferably ensured that no more than two optical pulses will ever be received by the switch during a single bit slot. Consequently, the switch will only enter a switched state if a single optical pulse is received during the bit slot. Such a bit slot containing a single optical pulse for application to the gate switching input 10 is hereinafter referred to as a switching signal.

Thus, with none or two optical pulses applied to the gate switching input 10, during a bit slot, an optical pulse stream provided at the gate input 7 will pass through the all optical gate to the second gate output 9. However the application of a single optical pulse to the gate switching input 10 will act as a switching signal causing a single bit slot of the optical pulse stream applied to the gate input 7, to be diverted from the second gate output 9, to the first gate output 8. Any further bit slots in the input optical stream will continue to be output from the second gate output 9 unless further switching signals are received.

In logical terms, the gate 6 operates such that reception of a bit slot containing one optical pulse is equivalent to receiving a logical signal of one logical state, whilst reception of a bit slot containing no or two optical pulses is equivalent to receiving a logical signal of the complementary logical state.

Figure 1D:
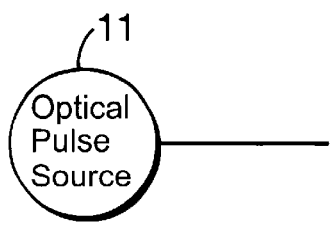
FIG. 1d shows a schematic representation of an optical pulse source.

FIG. 1d shows an optical pulse source 11, which usually takes the form of a semiconductor laser producing pulses at a wavelength of approximately 1.5 micrometers. The pulse repetition rate is approximately 1 GHz with the laser providing 10 ps pulses after linear chirp compensation in a length of non-dispersive optical fibre. Such a pulse source 11 will generally be configured to produce one of two optical pulse sequences. The first configuration, which will hereinafter be called a pulse stream generator generates an optical pulse stream with an optical pulse in every bit slot. The second configuration, which will hereinafter be called a sync pulse generator, generates an optical pulse stream with an optical pulse in one bit slot only.

Figure 2:
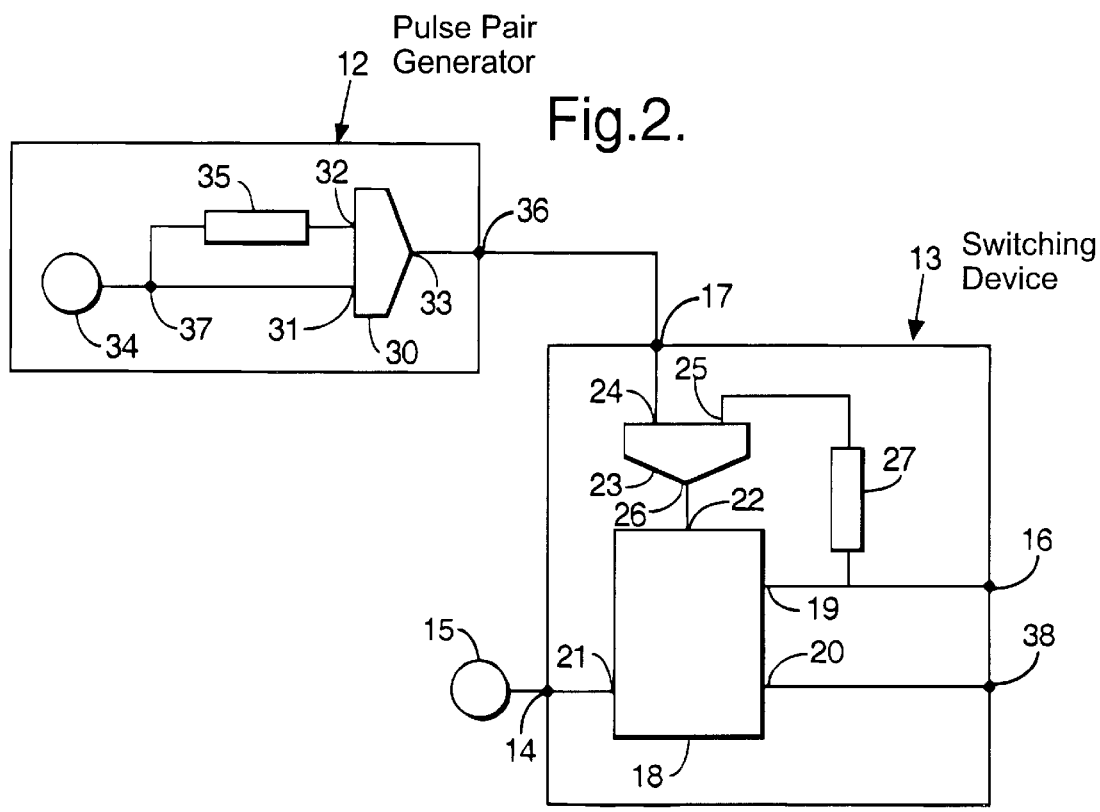
FIG. 2 shows a schematic representation of a window generator according to the present invention.

The window generator shown in FIG. 2 comprises a pulse pair generator 12 and a switching device 13. The switching device 13 has an input port 14, to which is coupled an pulse stream generator 15, two output ports 16, 38 and a switching input port 17 which is coupled to the generator output 36 of the-pulse pair generator 12.

The switching device itself consists of an all optical non-linear gate 18 the first gate output 19 of which is coupled to the second combiner input 25 of an optical combiner 23, via a feedback loop. The feedback loop is formed from a delay line 27, which, for the purposes of the window generator, introduces a time delay equivalent to a single bit slot. Accordingly, an optical pulse transferred through the delay line 27 will arrive at the second combiner input 25 of the optical combiner 23 in the bit slot immediately following the bit slot it would have arrived in if it had been travelling through a non-delaying connection.

The gate input, is coupled to the switching device input port 14 to receive the optical pulse stream generated by the pulse stream generator 15, whilst the gate switching input 22 is coupled to the combiner output 26 of the optical combiner 23. The first combiner input 24 is connected to the switching device switching input port 17, to receive optical pulses from the pulse pair generator 12.

The pulse pair generator 12 consists of an all optical combiner 30. Connected to a first combiner input 31 of the optical combiner 30 is a sync pulse generator 34, whilst connected to the second input 32 is a delay line 35. The delay line 35, which is also coupled to the sync pulse generator 34, operates to add a time delay equal to a number of bit slots N. The combiner output 33 of the combiner 30, is connected via an output port 36 of the pulse pair generator 12 to the switching input port 17 of the switching device 13.

Operation of the window generator will now be described with reference to FIG. 3 which shows bit slot time lines for several locations around the window generator circuit. Each time line, which is split into a series of bit slots, shows the presence of optical pulses at the respective points in the circuit. A stream of pulses is represented by the continuous presence of a pulse although it could equally be shown as a series of discrete pulses.

As described above, the switching device 13 is coupled to the pulse stream generator 15 which supplies the optical pulse stream to the input port 14 of the switching device and hence to the gate input 21 of the gate 18.

Initially, with no optical pulse applied to the switching input port 17 of the switching device, there will be no optical pulse input to the gate switching input 22 of the gate 18. Accordingly, the stream of optical pulses supplied to the gate input 21 will pass through the all optical gate 18 to the gate output 20. As a result, no optical pulses are output from the gate output 19 and a stream of pulses are output from the second gate output 20.

Figure 3:
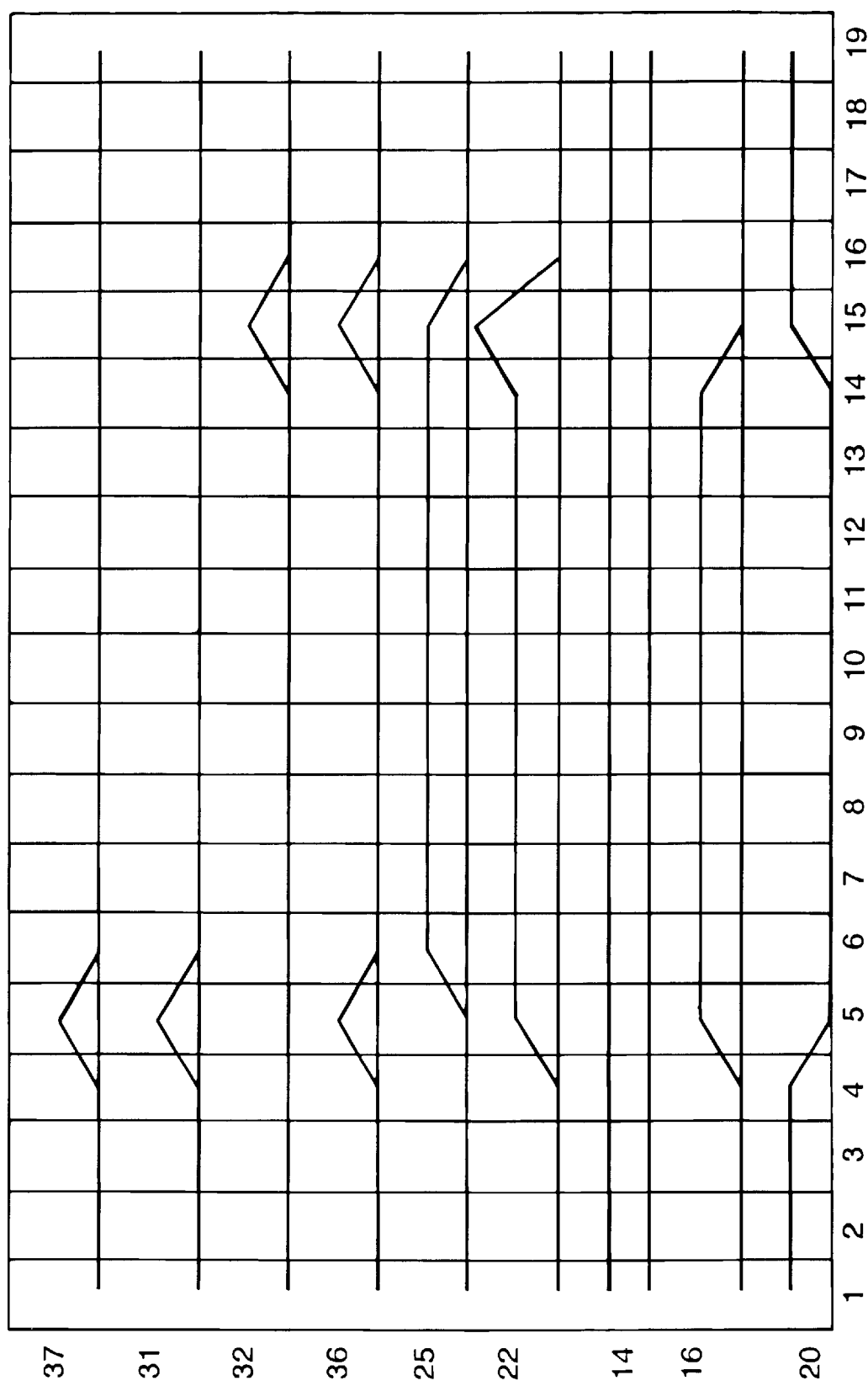
FIG. 3 shows bit slot time lines indicating the presence of optical pulses at several locations around the window generator of FIG. 2.

In bit slot 5, as labelled on FIG. 3, the single optical pulse is output from the sync pulse generator 34 and transferred to the optical combiner 30. As shown in FIG. 3, the single optical pulse arrives at a point 37 and is split into two copies, one of which is transferred directly to the first combiner input 31 of the all optical combiner 30, whilst the other is transferred to the second combiner input 32, via the delay line 35. The pulse travelling along the delay line 35 will be delayed by N bit slots (in the present example N=10) with respect to the pulse travelling directly to the optical combiner 30. As a consequence, the optical combiner 30 will receive one optical pulse at the combiner input 31 in the bit slot 5 and a second optical pulse at combiner input 32 in bit slot 15, as shown in FIG. 3.

These optical pulses are then combined to form a single optical pulse stream including two optical pulses separated by N bit slots, which is transferred to the switching input port 17 of the switching device 13.

When the first pulse is received from the pulse pair generator 12, it will be input to the switching input port 17 of the switching device and hence to the first combiner input 24 of the optical combiner 23, as shown. This optical pulse is then transferred to the gate switching input 22 of the gate 18 to act as a switching signal. This will cause a first optical pulse to be switched from the gate input 21 to the gate output 19 during bit slot S.

This optical pulse is fed back via the delay line 27 to the second combiner input 25 of the optical combiner 23. Because the delay line 27 introduces a single bit delay into the feedback loop, the fed back optical pulse will arrive back at the gate switching input 22 in bit slot 6, as the subsequent optical pulse output from the pulse stream generator 15 is received at the gate input 21. Accordingly the first optical pulse output from the gate output 19 will act as a switching signal, in bit slot 6, causing the next optical pulse to be switched from the gate input 21 to the gate output 19. This is repeated for bit slots 6 to 14, causing a stream of 10 optical pulses to be output from the gate output 19.

This continues until the second pulse is output from the pulse pair generator 12, in bit slot 15. This pulse will arrive at the first combiner input 24 of the optical combiner 23 in bit slot 15, the same time as an optical pulse from the feedback loop is received at the second combiner input 25.

With both pulses arriving at the all optical combiner 23 simultaneously, two optical pulses will be output in the same bit slot. Accordingly, the gate switching input 22 will detect a total energy equivalent to two optical pulses. This does not act a switching signal and as a result, the stream of optical pulses from the pulse stream generator 15 will no longer be switched to the gate output 19.

Consequently, when placed in combination, the optical combiner 23 and the gate 18 function as an XOR system, with the gate 18 only entering the switched state when only one optical pulse is received at one of the optical combiner inputs 24, 25. When no pulse is received, or a pulse is received at both inputs, simultaneously during the same bit slot period, then the signal output from the combiner will not act as a switching signal, causing the gate to remain in an unswitched state.

Thus by providing an optical signal stream from the pulse pair generator 12 with two pulses, the pulses being separated by a predetermined number of bit slots N, the window generator will output an optical signal stream consisting of N optical pulses, from the gate output 19.

Furthermore, as it is the delay line 35 that introduces the delay in the pulse pair generator 12, it is the length of the time delay of the delay line 35 that sets the number of bits N. Thus in the example of FIG. 3, the delay line 35 introduces a delay equivalent to 10 bit slots, causing the window generator to output a sequence of 10 optical pulses from the output port 16. However, the number of bit slots that the delay line 35 delays the optical pulse by could be altered, causing a corresponding change in the number of optical pulses output from the output port 16 of the switching device 13.

It should also be noted that as the second gate output 20 generates an optical signal stream that is the logical complement of the optical signal stream generated by the first gate output 19. The second output port 38 is coupled to the gate output 20 so as to produce an optical signal stream including an N bit slot window, the N bit slots not having an optical pulse in. Obviously, with such a stream, any bit slots not inside the N bit window will include an optical pulse.

Examples of all optical circuits utilizing the window generator of the present invention will now be described.

All optical regenerative memories utilizing an all optical non-linear gate are described in a paper entitled "All-Optical Regenerative Memory", A. J. Poustie, K. J. Blow and R. J. Manning, Nonlinear Guided Waves and their applications, Vol. 15, 1996 OSA Technical Digest Series.

Figure 4:
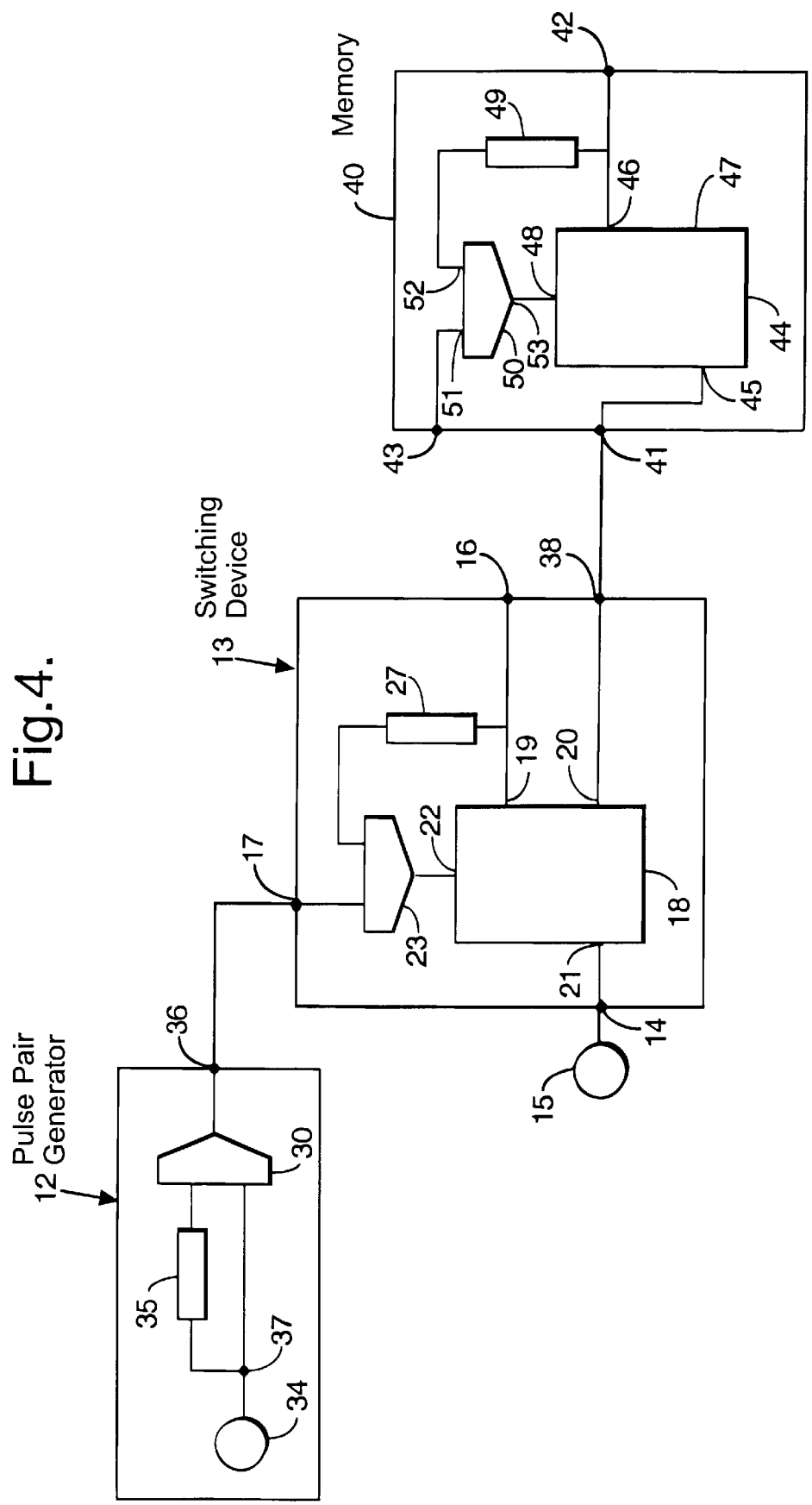
FIG. 4 shows a schematic representation of a regenerative memory with reset utilizing the windows generator of FIG. 2.

FIG. 4 shows a resettable regenerative memory comprising an L bit regenerative memory 40 connected to the window comparator of FIG. 2.

The memory 40, which has a memory input port 41, a memory output port 42 and a memory word input port 43, comprises an all optical non-linear gate 44. The gate input 45 is connected via the memory input port 41 to the output port 38 of the switching device 13 of the window generator, which generates an optical pulse stream for the memory 40. The first gate output 46 is connected to the memory output port 42 and, via a feedback loop with a delay line 49, to an all optical combiner 50.

The all optical combiner 50 has a combiner output 53 connected to the gate switching input 48 of the gate 44, along with two combiner inputs 51, 52. As in the window generator of FIG. 2, the optical combiner 50 and optical gate 44 act as an XOR system, the gate only being switched on reception of a bit slot containing a single optical pulse which acts as a switching signal.

The first combiner input 51 is connected to the memory word input port 43, for receiving the L bit word to be stored, whilst the second combiner input 52 is connected to the first gate output port 46, via the delay line 49. The delay line 49 introduces a time delay equivalent to L bit slots to the data flow from the gate output to the combiner input.

Operation of the memory 40 will now be described, with the optical signal stream initially considered as a continuous stream of optical pulses, with no empty bit slots.

With no optical pulses applied to the memory word input 43, the stream of optical pulses supplied to the memory input port 41 will be output from the second gate output 47 of the gate 44. To store a word, which is data comprising an optical signal of L bit slots in length, the word is input to the memory word input 43 and transferred via the optical combiner 50 to the gate switching input 48.

The word acts as a series of switching signals. Thus as each bit slot of the word is applied to the switching input, it will cause a copy of contents of the bit slot to be output from the first gate output 46. So, for example, if the first bit slot contains an optical pulse, this will act as a switching signal causing a single optical pulse to be transferred from the optical pulse stream supplied to the gate input 45 to the first gate output 46. This optical pulse will then be output from the output port 42 with a copy of the pulse being fed back via the delay line 49, to the combiner 50.

As the delay line 49 introduces an L bit slot delay, this first bit slot containing an optical pulse will not reach the second combiner input 52 until all the L bit slots in the word have passed through the combiner 50.

Supposing the second bit slot of the word contains no optical pulse, then it does not act as a switching signal and the optical pulse in the corresponding bit slot in the input optical pulse stream will be transferred to the second gate output 47. Accordingly an empty bit slot will be output from the first gate output 46, which will again be fed back via the delay line to the second combiner input 52.

This process is repeated for all the L bit slots of the word such that a copy of the word is generated at the second gate output 46. As mentioned with respect to each bit slot, the copy of the word is split, with one copy being available for output from the memory 40 at the memory output port 42, whilst the other copy is fed back to the optical combiner 50, via the delay line 49.

As the delay line 49 delays the transfer of the word by L bit slots, then the first bit slot of the copied word will reach the input 52 of the optical combiner immediately after the last bit slot of the word was originally input into in the input 51 of the combiner 50. This copy of them word then acts as a further series of switching signals to generate further copies of the word.

Consequently, a copy of the word constantly recirculates in the feed back loop acting as a set of switching signals to cause further copies of the word to be generated and output from the first gate output 46.

As the memory operates to regenerate the word by transferring the optical pulses received at the gate input 45 to the first gate output 46 using the previous copy of the word to act as switching signals, it is possible to reset the memory by replacing the input optical pulse stream received at the memory input port 41, with an optical pulse stream including a window of at least L bit slots in which no optical pulses are present. The gate will then transfer the empty bit slots, to the feedback loop, thus preventing a further copy of the word and hence further switching signals being generated.

Such an L bit slot window containing no optical pulses can be obtained from the window generator of FIG. 2, by connecting the memory input port 41 of the memory 40 to the output port 38, and ensuring that the N bit slot delay introduced by the delay line 35 of the pulse pair generator is greater than, or equal to, L bit slots in length (i.e. N≧L).

Accordingly, by utilizing the apparatus configuration shown in FIG. 4, in which delay line 35 of the pulse pair generator introduces an N bit slot delay (for N≧L), an L bit resettable regenerative memory is achievable, the memory being reset upon the generation of a pulse by the sync pulse generator 34, which triggers the generation of the N bit slot window.

Figure 5:
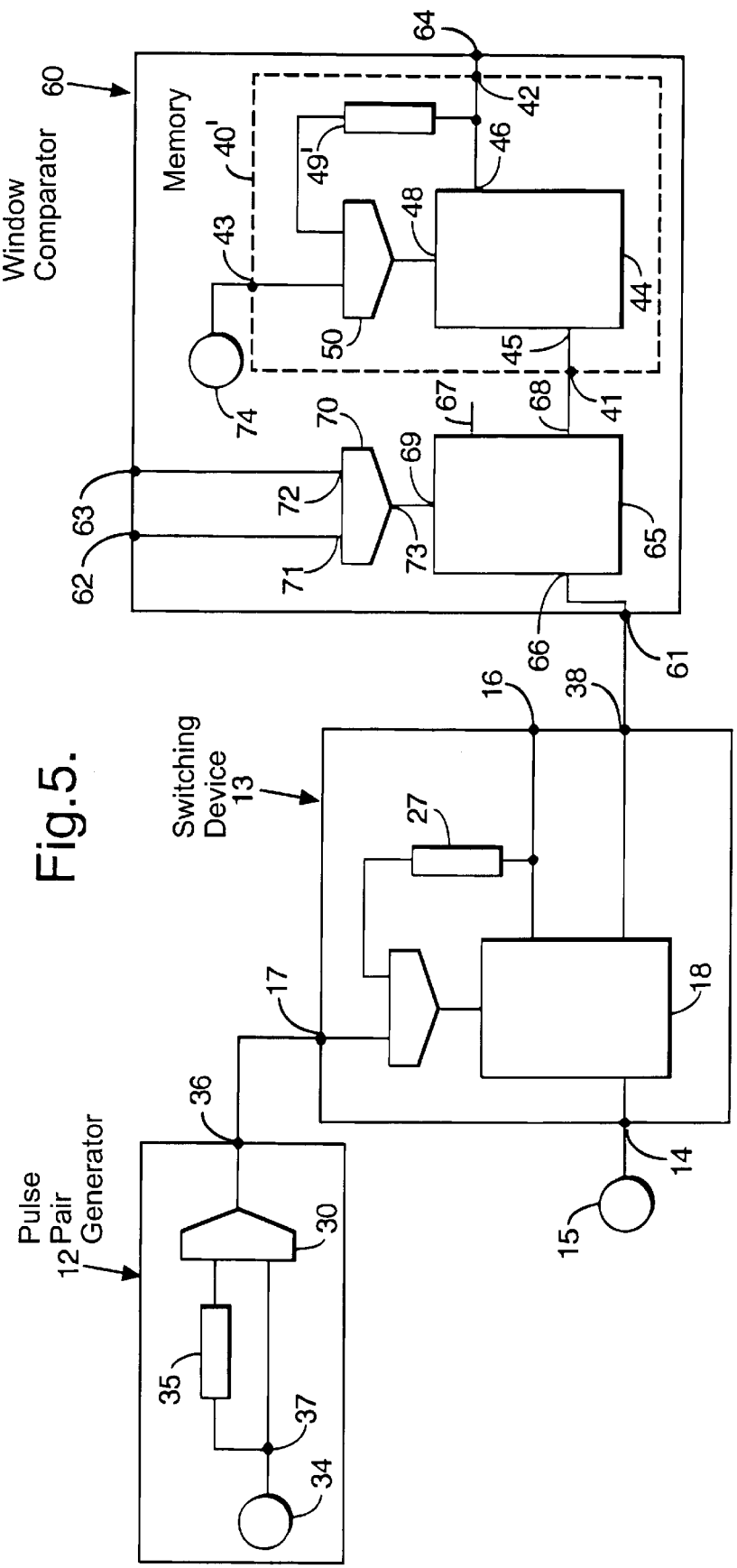
FIG. 5 shows a schematic representation of a word comparator with reset utilizing the window generator of FIG. 2.

FIG. 5 shows a resettable word comparator system utilizing the window generator of FIG. 2. The system includes a window comparator 60 having a comparator input port 61, first and second comparator word input ports 62, 63 and a comparator output port 64. The comparator 60 comprises an all optical non-linear gate 65, whose second gate output 68 is coupled to the memory input port 41 of a 1 bit regenerative memory 40'.

The 1 bit regenerative memory 40' functions as for the L bit regenerative memory 40, described above, except with the delay line 49' having only a 1 bit slot delay instead of the L bit slot delay that the delay line 49 has. Accordingly, the memory 40' is only able to store a word of 1 bit slot in length. This word, which is supplied to the memory word input 43 by a sync pulse generator 74, is a single optical pulse which acts as a switching signal causing a single optical pulse to recirculate in the memory 40' as long as a continuous stream of optical pulses is applied to the memory input 41.

Coupled to the gate switching input 69 of the gate 65 is an optical combiner 70 whose first and second combiner inputs 71, 72 are connected to first and second comparator word input ports 62, 63, of the word comparator 60, respectively. The gate input 66 is connected via the comparator input port 61 to the output port 38 of the window generator of FIG. 1. This generates an optical signal stream which is transferred via the gate 65 to the memory input 41 of the memory 40'. The first gate output 67 is left unconnected.

Operation of the word comparator 60 will now be described, with the optical signal stream initially considered as a continuous stream of optical pulses, with no empty bit slots.

The word comparator 60 operates to compare two words input to the comparator word input ports 62, 63. Each word is an optical pulse sequence of a specific number of bit slots M in length, where M is an integer, which represents a word comprising M bits of data. The words are input to the comparator word input ports 62, 63 and transferred to the optical combiner 70.

The optical combiner 70 and the optical gate 65 act as an XOR system, such that the gate 65 will only enter the switched state should the two words differ. This arises due to the combiner 70 adding the two words. If the words are identical, then for the equivalent bit slots of the words that contain optical pulses, the optical combiner will output a double pulse signal, and for the equivalent bit slots containing no optical pulse, the combiner 70 will not output any optical pulse. Accordingly, the switch will not enter the switched state.

However, when the two received words differ, this means that at some point a bit slot of one word will contain an optical pulse, whilst the corresponding bit slot of the second word will not contain an optical pulse. As a consequence, when combined by the combiner, for the bit slot that differs, the optical combiner will output a single optical pulse. This then acts as a switching signal causing the switch to enter the switched state, resulting in an optical pulse being output from the first gate output 67. In fact if more bit slots differ between the two words, then more optical pulses will be output from the first gate output.

If no switching signal is received at the gate switching input 69 then the optical pulse stream, received from the output port 38 of the window generator, is output from the second gate output 68 to the memory input 41 of the memory 40'. As this is a continuous stream of optical pulses then, as described above, a single optical pulse will constantly recirculate in the memory 40'.

However, if a switching signal is received at the gate switching input 69 of the gate 65, then a single optical pulse, from the optical pulse stream will be transferred to the first gate output 67. Consequently the optical signal stream output from the second gate output 68 will have an empty bit slot corresponding to the optical pulse that was transferred to the first gate output 67.

This empty bit slot is transferred to the memory input 41 of the memory 40' and is transferred to the first gate output 46 of the gate 44. From here, the empty bit slot will pass round the feedback loop of the regenerative memory, back to the gate switching input 48, preventing the transfer of any further optical pulses received at the gate input 45. Consequently the memory contents no longer contain an optical pulse.

Thus, if the memory contents contains an optical pulse, this indicates that the optical pulse stream output from the gate output 68 contains no empty slots, indicating that the two words are identical. Otherwise, if the memory contents are reset, this indicates the presence of an empty slot in the optical signal stream supplied to the memory input 41, hence indicating a difference in the two words.

However, once the comparator 60 has been initialised by the pulse from the sync pulse generator 74, it will remain in this state unless two different words are supplied to the comparator word input ports 62, 63. In some circumstances it may be necessary to reset the comparator 60.

This is achieved in a manner similar to the resetting of the L bit regenerative memory described with respect to FIG. 4. Thus, by obtaining the optical signal stream for the comparator input 61 from the output port 38 of the window generator, the window generator can be used to generate signal stream including an N bit slot window where N is of 1 or more bit slots in length. This optical pulse stream with the N empty bit slots is transferred via the gate 65 to the memory input 41, causing the memory to reset as described with reference to FIG. 4.

Figure 6A:
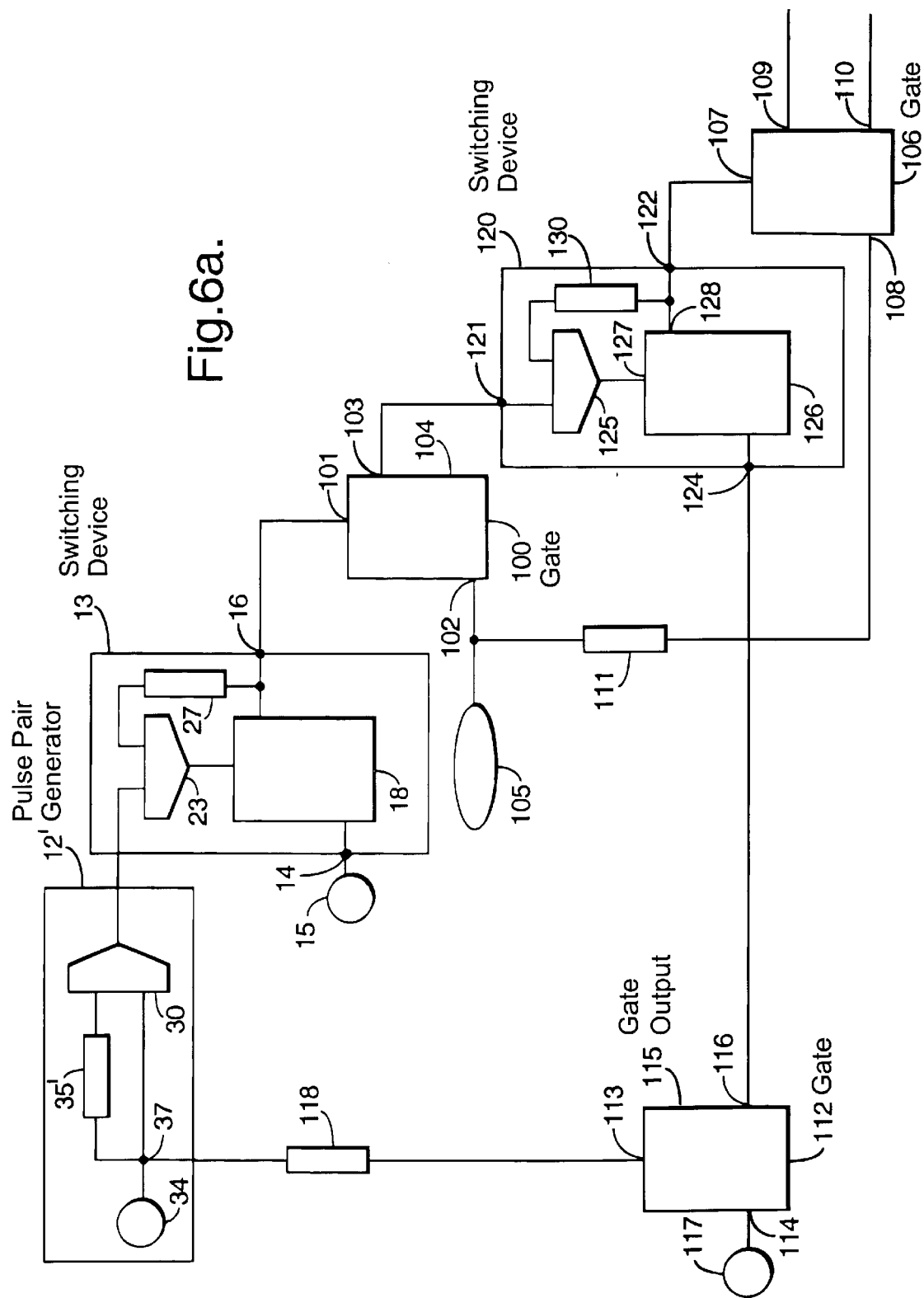
FIG. 6a shows a schematic representation of a packet killer utilizing the window generator of FIG. 2.

FIG. 6a shows in schematic form an all optical packet killer which can be used to remove all optical data packets from a network system.

In networks that transfer data in packets, it is a common problem that incorrectly addressed packets continue to propagate around the network indefinitely. One possible way around this problem is to only use addresses with even (or odd) parity and then eliminate all packets which have an address of the opposite parity. Thus, a packet killer system must be able to detect the address of a data packet, which is usually stored in the packet header, determine the parity of the address and output the packet from different outputs depending on the parity.

The apparatus shown in FIG. 6a comprises a pulse pair generator 12' and a switching device 13 which together form the window generator of FIG. 2. This window generator is used to generate a window of Q bit slots in length, where Q is the number of bit slots used by the header of the data packet, i.e. the window is equal in length to the header of the data packet, the total length of the packet being R bit slots. This is achieved by ensuring that the delay line 35' of the pulse pair generator 12' introduces a delay equivalent to Q bit slots, causing the optical pulses output from the pulse pair generator 12', to be separated by an Q bit slot interval.

The output port 16 of the switching device 13 is connected to a gate switching input 101 of an optical gate 100. The gate 100 has a gate input 102 which is connected to a packet source 300 which is used to input the packets to the circuit. The second gate output 102 of the gate 101 is unconnected, whilst the first gate output 103 is coupled to the switching input port 121 of a second switching device 120.

The second output port 123, of the switching device 120, is unconnected and the first output port 122 is connected to the gate switching input 107 of an optical gate 106. The first and second gate outputs 109, 110 are used to output the packet from the apparatus as either a rejected or accepted packet, as will be described below. The gate 106 also has a gate input 108 which is coupled via a delay line 111 to the packet input 105.

The switching device 120 also has an input port 124 which is connected to the second gate output 116 of an all optical gate 112. The first gate output 115 is unconnected, whilst the gate input 114 is coupled to a pulse stream generator 117 which generated a continuous stream of optical pulses. The gate 112 has a gate switching input 113 which is coupled via a delay line 118 to the point 37 of the pulse pair generator 12'.

Operation of the packet killer will now be described with reference to FIG. 6b which shows the relative timing of pulses throughout the circuit for a packet with an even parity address and then for a packet with an odd parity address.

The first task of the circuit is to separate the header from the data packet. This is achieved by using the window generator, comprising the pulse pair generator 12' and the switching device 13, to generate a window of Q bit slots in length, Q being the number of bit slots of the header of the data packet, the data packet being R bit slots in length. This window is output from the switching device output port 16 and is shown in FIG. 6b as the pulse train labelled 16.

The Q bit slot window pulse stream is fed to the gate switching input 101 of the optical gate 100. The data packets, which are input to the circuit at the packet input 105 are copied to the gate input 102. This is timed such that the first bit slot in the header of the packet will arrive at the gate input 101 at substantially the same time that the first bit slot of the Q bit slot window arrives at the gate switching input 101. Accordingly, the header of the data packet is transferred to the first gate output 103 of the gate 100 and transferred to the switching input port 121 of the switching device 120. This is shown by the 121 pulse sequence in FIG. 6b. The remaining part of the data packet, which comprises the packet payload, will simply be transferred to the second gate output 104, as shown.

As can be seen from FIG. 6b, the header of the first packet comprises an even number of optical pulses, whereas the header of the second packet comprises an odd number of optical pulses. These optical pulses are used as switching signals to switch the switching device 120.

The source of optical pulses provided to the input port 124 of the second switching device 120 is provided by the pulse stream generator 114. The generated pulse stream is input to the gate 112, which operates to transfer the optical pulse stream to the regenerative memory via the second gate output 116. A single optical pulse is applied to the gate 112 via the delay line 118 from the point 37 in the pulse pair generator 12'. This is used as a switching signal, at a later time, to reset the second switching device 120, as will be described below.

Assuming for now that a constant optical stream is supplied to the input port 124 of the switching device 120, then the switching device 120 is arranged such that an optical pulse provided to the switching input port 121 acts as a switching signal, causing the switching device 120 to change the output optical pulse stream between a continuous stream of optical pulses and a stream of no optical pulses.

Thus the second switching device 120 function as for the switching device of FIG. 2.

Upon the application of the even parity header to the switching input port 121, the first pulse will initially pass through the optical combiner 125 to the gate switching input 127 of the all optical gate 126. This switching signal causes a single optical pulse of the optical pulse stream applied to the input port 124 to be switched to the first gate output 128. This will circulate in the feedback loop to return to the gate switching input 127 via the optical combiner 125. As the delay line 130 introduces a 1 bit slot delay, the pulse will arrive at the optical combiner 125 at the same time that an empty bit slot arrives from the switching input port 121.

Consequently, a second switching signal is applied to the gate switching input 126 causing a second pulse to circulate through the feedback loop.

Whilst these two optical pulses have been transferred from the input port 124 to the first gate output 128, the output port 122 also outputs copies of the two optic pulses, as shown in the 16 bit slot section of FIG. 6b.

However, as the second optical pulse circulating in the feedback loop reaches the optical combiner 125 a pulse is also transferred from the switching input port 121. As a consequence two optical pulses are output from the optical combiner to the gate switching input 127. As the switch 126 does not detect the double optical pulse in a single bit slot as a switching signal, no optical pulse is transferred to the first gate output 128. Accordingly, an empty bit slot will be output from the switching device output port 122.

This is repeated until, as shown in FIG. 6b, when the header has been fully applied to the switching input port 121 the output port 122 will output a stream of empty bit slots.

These empty bit slots are applied to the gate switching input 107 of the gate 106. Supplied to the gate input 108 is a copy of the packet which is fed via the delay line 111 from the packet input 105. This delay line 111 applies a time delay to the packet, such that the first bit slot of the packet arrives at the gate 106 at the same time as the first bit slot of optical pulse stream output from the switching device output port 122 i.e. the delay line 111 applies a Q bit slot delay.

Thus the output from the second switching device 120, is used to control whether the data packet, including a copy of the header, is transferred from the gate input 108 to the first gate output 109 or the second gate output 110.

In the case of empty bit slots being applied to the gate switching input 107, the data will be transferred directly to the second gate output 110, as shown in FIG. 6b.

Operation for a packet with an odd parity address is identical except that the second switching device 120 will be left in a state in which a stream of optical pulses are output from the output port 122 to the gate switching input 107 of the gate 106. These act as switching pulses causing the data packet to be transferred to the first gate output 109 as shown in the odd parity section of FIG. 6b.

In order for the second switching device 122 to correctly detect the parity of the header address, it is necessary for there to be no optical pulses in the feedback loop when the first optical pulse is received at the switching input port 121. In order to achieve this, the optical pulse stream supplied to the input port 124 of the switching device 120 has an empty bit slot which is timed to arrive at the input port 124 at the same time that the previous data packet has been completely transferred from the gate input 108 of the gate 106 to one of the gate outputs 109, 110.

The empty bit slot is generated by the application of a single switching signal to the gate switching input 113, of the gate 112. The single switching signal is obtained from the point 37 in the pulse pair generator 12" and is delayed by Q+R bit slots by the delay line 118, such that it arrives at the gate 112 at the same time that the header and packet have been handled by the second switching device 120. The empty bit slot operates to reset the second switching device 120 by ensuring that should any optical pulses be recirculating in the second switching device 120, then they will cause the empty bit slot received at the input port 124 to be switched to the first gate output 128. As a result, no further optical pulses recirculate in the feedback loop until further pulses are received at the switching input port 121.

Figure 7A:
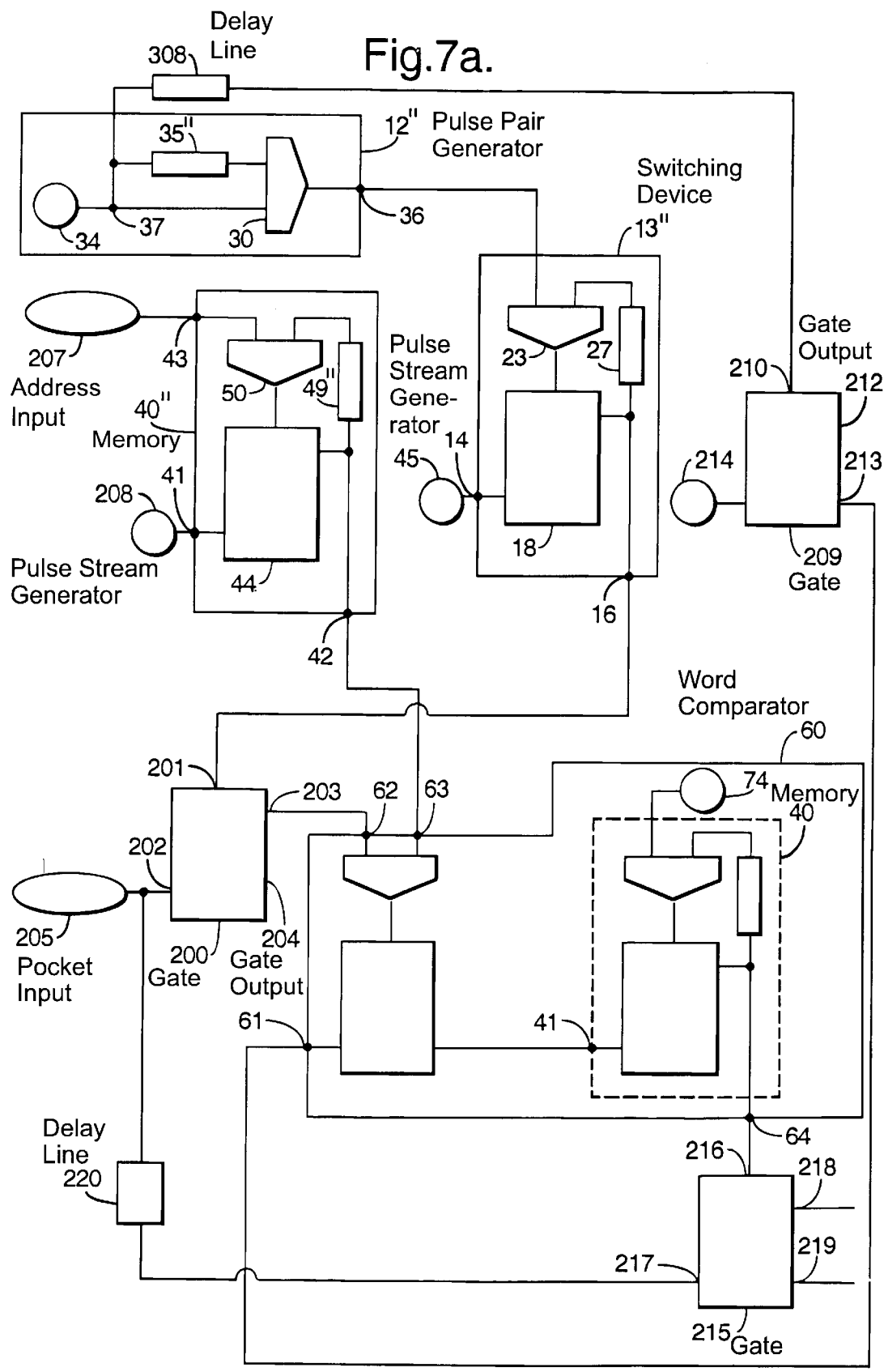

A packet receiver utilizing a window generator according to the present invention is shown in FIG. 7a. The packet receiver operates to read the address of a data packet and then determine whether the address is the same as the address of the receiver itself, and control the flow of the data accordingly.

The data packet itself consists of three sections, a header, data and a trailing section containing no optical pulses. Both the header and the trailing section are of S bit slots in length, whilst the data section is of T bit slots in length.

The packet receiver comprises a pulse pair generator 12" coupled to a switching device 13" to form the window generator of FIG. 2, with the delay line 35" providing a S bit slot delay, to cause the window generator to generate an S bit slot window. The switching device output port 16 is connected to the gate switching input 201 of a gate 200. The gate input 202 which is connected to a packet input 205 at which a copy of the packet is received by the circuit.

The second gate output 204 is unconnected, whilst the first gate output 203 is supplied to the first word input port 62 of the word comparator 60 of FIG. 4. The second word input port 63 of the word comparator 60 is connected to the memory output port 42 of a regenerative memory 40", which functions as for the L bit regenerative memory 40, described above, except that L bit slot delay line 49 is replaced by a delay line 49" that introduces a delay equivalent to S+T+S bit slots (i.e. the entire length of the data packet).

The memory input port 41 is coupled to a pulse stream generator 208 which generates a continuous stream of optical pulses. The memory word input port 43 of the memory 40" is coupled to an address input 207 which supplies the address of the receiver circuit. The actual address is S bit slots long, but has an additional trailing section, containing no optical pulses, of S+T bit slots in length, which is added to ensure that the address is only output from the memory output port 42 once every time a data packet is received.

A delay line 308 is coupled to the point 37 of the pulse pair generator 12" to obtain a single optical pulse which is used as a switching signal by providing it to the gate switching input 210 of gate 209. The gate 209 is coupled to an pulse steam generator 214 which generates a continuous stream of optical pulses. The gate 209 has a first gate output 212 which is unconnected, and a second gate output 213 coupled to the comparator input port 61 of the word comparator 60. The comparator output port 64 is connected to the gate switching input 216 of a gate 215. The gate input 219 is connected to the packet input 205 via a delay line 220, for receiving a copy of the packet.

Operation of the packet receiver will now be described with reference to FIG. 7b which shows the presence of optical pulses at several locations around the packet receiver of FIG. 7a.

Upon initialisation of the packet receiver, the address of the packet receiver circuit is supplied to the address input 207 and hence to the memory word input 43 of the regenerative memory 40". A copy of this address is stored in the regenerative memory and repeatedly output from the memory output 42 to the word input 63 of the word comparator 60.

The pulse pair generator 12" and the switching device 13 generate a header window which is of S bit slots in length, S being the number of bit slots in the packet header. The optical pulse stream including the S bit slot window is output from the switching device output 16, as shown in FIG. 7b, and supplied to the gate switching input 201 of the gate 200. The data packet itself is supplied to the gate input 202 such that the first bit slot of the packet arrives at the same time as the first bit slot of the S bit slot window. The S bit slot window then acts as S consecutive switching signals causing the header of the data to be switched to the first gate output 203 and transferred to the comparator word input port 62 of the word comparator 60.

As the address stored in memory 40' is equal in length to the entire data packet, the first bit slot of the address will arrive at the comparator word input port 63 simultaneously with the first bit slot of the header. The The word comparator then operates as described in FIG. 4 above, to compare the optical pulse streams received at the comparator word input ports 62, 63. Thus, the word comparator compares the address of the receiver circuit with the address indicated in the packet header. If the addresses are identical, as shown by the CORRECT ADDRESS set of pulses in FIG. 7b, then the word output port 64 will output a continuous series of optical pulses.

Simultaneously a copy of the data packet is supplied to the gate input 217 of the gate 215 via the delay line 220, which delays the transfer of the packet by S bit slots, such that the first bit slot of the packet arrives at the gate input 217 at the same time that the header address comparison has finished. As the comparator output port 64 is a stream of optical pulses, due to the compared words being identical, the optical pulses act as switching signals so that the data packet received at the gate input 217 is transferred to the first gate output 218, indicating that the packet has the correct address to be received.

The circuit is then reset by the provision of a single pulse through the delay line 208 to the switching input 210 of the gate 209. This acts to generate an empty bit slot in the continuous optical pulse stream by transferring a single optical pulse, from the received continuous pulse stream, to the first gate output 212. The optical pulse stream with the single empty bit slot is output from the gate output 213 to the comparator input port 61 of the word comparator 60. This resets the word comparator ready for the next packet to be received.

When the next data packet is received, the circuit is reinitialised. This involves having the sync pulse generator 74 generate an optical pulse to ensure that an optical pulse is circulating in the regenerative memory 40', to allow the circuit to function correctly.

Figure 7B:
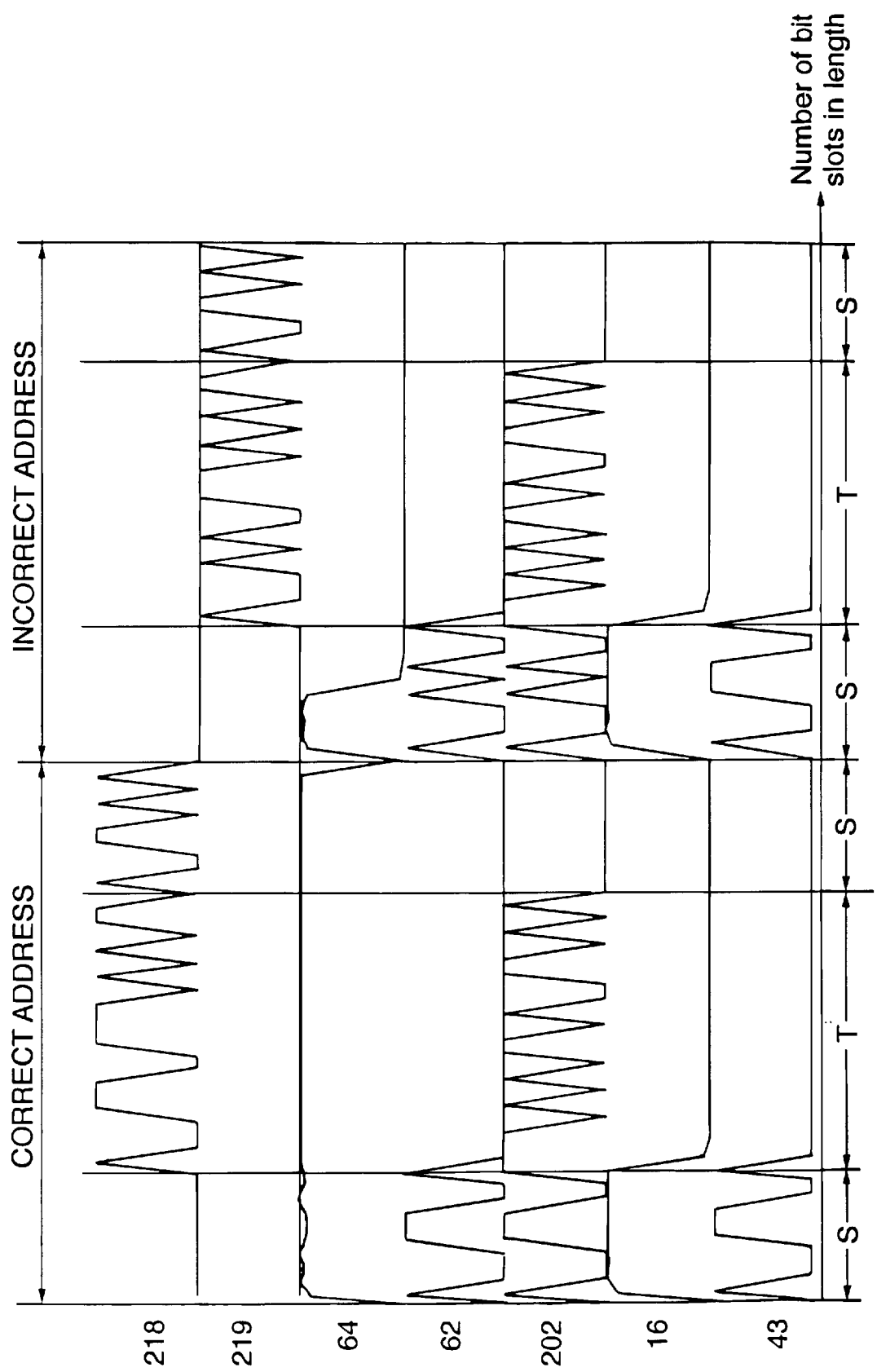

The second packet of data is now received, as shown by the INCORRECT ADDRESS set of pulses shown in FIG. 7b.

For handling the second packet, again a copy of the address is supplied to the comparator word input port 63 of the word comparator 60. The second packet is received at the packet input 205 and as described above, the header is separated from the packet and transferred to the word comparator 60. In this case the header is different to the address and the comparator therefore gives an output which is a continuous stream of empty bit slots, from the comparator output port 64.

This continuous stream of empty bit slots is supplied to the gate switching input 216, a shown in FIG. 7b, causing a copy of the packet supplied to the packet input 205 to be transferred to the second gate output 219 of the gate 215, indicating that the packet is not to be received by the circuit.

As mentioned above, the data packet comprises a header, data and a trailing section containing no optical pulses. The trailing section is required as the packet is not output from the respective gate output 218, 219 until the header has been processed. This means that there is a delay of S bit slots from when the packet is received to when it reaches one of the gate outputs 218, 219 and as the packets are received at the packet input 205 immediately after each other, processing of the subsequent packet begins before the final S bit slots of the packet have been output. As this could cause the last S bit slots of data to be transferred to the wrong gate output, it is essential to ensure the final S bit slots of the packet are redundant. This is achieved by incorporating an S bit slot length trailing section to the packet which contains no optical pulses.

What is claimed is:

1. A method of generating an optical bit slot window comprising N bit slots, all the N bit slots representing the same logical state, using an all-optical switching device, the switching device having an input coupled to an optical pulse source which generates optical pulses in successive bit slots, each optical pulse representing a logical state, an output which generates an output stream defining the bit slot window, and a switching input couple to a source of optical switching signals, wherein the application of switching signals to the switching input selectively switches a connection between the input and the output so as to change the logical state of the output, the method comprising: generating a first switching signal; copying the first switching signal to generate a second switching signal; transferring the first switching signal to the switching input of the switching device; and, after a time interval corresponding to N bit slots, transferring the second switching signal to the switching input of the switching device.

2. A method according to claim 1, wherein each switching signal comprises a single optical pulse in a bit slot.

3. A method according to claim 1, wherein the switching device includes an all-optical non-linear gate, the gate having a gate input coupled to the switching device input, a gate output which generates a gate output stream, and a gate switching input coupled to the switching device input, wherein the application switching signal to the switching input selectivity switches a connection between the gate input and the gate output so as to change the logical state of the gate output stream for a time interval corresponding to a single bit slot, the method further comprising applying the first switching signal to the gate switching input to change the logical state of the gate output stream for a time interval corresponding to a single bit slot; and, feeding back N bit slots of the gate output stream, with a single bit slot delay, to the gate switching input to maintain the logical state of the gate output stream.

4. A method according to claim 3, the method further comprising combining the gate output stream and the switching signals prior to input to the gate switching input, such that if a bit slot having the same logical state as the switching signals, and a switching signal are combined, then no switching signal is applied to the gate switching input.

5. A method according to claim 3, wherein the N fed back bit slots in the gate output stream have the same logical state as the switching signals.

6. A method according to claim 3, wherein each of the N fed back bit slots in the gate output stream comprise a single optical pulse in a bit slot.

7. A method according to claim 3, the method further comprising obtaining the output stream from the gate output, such that each of the N optical bit slots contains an optical pulse.

8. A method according to claim 3, the gate further comprising a second gate output, the second gate output generating a second gate output stream having a complementary logical state with respect to the first output stream the method further comprising obtaining the output stream from the second gate output such that each of the N optical bit slots contains no optical pulse.

9. A method of comparing first and second optical binary words, used with a method of generating an optical bit slot window as in claim 2, the method of comparing first and second optical binary words having each word being defined as a sequence of M optical bit slots optically representing respective logical states, utilizing an all optical work comparator, the comparator having a first word input, a second word input, and input which receives a stream of optical pulses, and an output, the method comprising receiving the first and second binary words at the first and second word inputs respectively; comparing the respective bit slots of the two binary words; selectively switching a connection between the input and the output such that the output indicates the relationship between the two binary words; and generating a stream of optical pulses, in which the stream of optical pulses defines an optical bit slot window including at least one bit slot containing no optical pulses; and, applying the stream of optical pulses to the word comparator, the presence of the bit slot window in the stream of optical pulses causing the word comparator to reset.

10. A method according to claim 9, the method further comprising generating a combined optical signal stream by combining respective bit slots of the first and second binary words such that the corresponding bit slot of the combined optical signal stream has a first logical state if the respective bit slots are identical and a second complementary logical state if the respective bit slots are different, and using the logical state of the combined optical signal stream to selectively switch the connection between the comparator input and the comparator output.

11. A method according to claim 10, the word comparator further comprising an all optical non-linear gate the gate comprising a gate input, a gate output, which generates a gate output stream, and, a gate switching input, wherein the application of a switching signal to the gate switching input selectively switches the connection between the gate input and the gate output, the method further comprising: applying the combined optical signal stream to the gate switching input such that the gate selectively switches a connection between the gate input and the gate output so as to indicate the relationship between the two binary words.

12. A method according to claim 11, wherein applying a switching signal to the gate switching input causes the gate output stream to change from the second logical state to the first logical state for a time period corresponding to one bit slot.

13. A method according to claim 12, wherein the switching signal is an optical bit slot having the second logical state.

14. A method according to claim 10, wherein a bit slot having the second logical state contains a single optical pulse.

15. A method according to claim 11, the word comparator further comprising an optical regenerative memory which stores one optical bit slot representing a logical state, the memory having a memory word input, a memory output, and a memory input, the method further comprising: applying the one bit slot to be stored to the memory word input; applying the gate output stream to the memory input; and, outputting a copy of the stored bit slot from the memory output.

16. A method according to claim 15, wherein the bit slot to be stored has the second logical state and wherein, if the gate output stream contains a bit slot having the first logical state, the memory is reset such that the stored bit slot is replaced by a bit slot having the first logical state.

17. A method according to claim 15, the controller further comprising an optical pulse generator the method further comprising applying a single optical pulse to the memory word input to generate the bit slot to be stored.

18. Apparatus for generating an optical bit slot window comprising N bit slots, all the N bit slots representing the same logical state, the apparatus comprising an optical pulse source which generates optical pulses in successive bit slots, each optical pulse representing a logical state; a source of switching signals which generates first and second switching signals separated by a time interval corresponding to N bit slots; and, a switching device, the switching device comprising a switching input coupled to the source of switching signals, an output which generates an output stream defining the bit slot window, and an input, coupled to the optical pulse source, wherein the application of switching signals to the switching input selectively switches a connection between the input and the output so as to change the logical state of the output; and wherein the source for generating optical switching signals comprises a source for generating a single optical switching signal; a delay line; and, an optical combiner, the second combiner comprising first and optical combiner inputs coupled to the single optical switching signal source and a combiner output, wherein the first combiner input is connected to the single optical switching signal source via the delay line such that the single optical switching signal is input to the first and second combiner inputs separated by a time interval corresponding to N bit slots such that first and second optical switching signals are output from the combiner output separated by N bit slots.

19. Apparatus according to claim 18, wherein each switching signal comprises a single optical pulse in a bit slot.

20. Apparatus according to claim 18, wherein the switching device comprises an all-optical non-linear gate, the non-linear gate comprising a gate input coupled to the switching device input; a gate output which generates a gate output stream; a gate switching input coupled to the switching device switching input, wherein the application of a switching signal to the gate switching input selectively switches a connection between the gate input and the gate output so as to change the logical state of the gate output stream for a time interval corresponding to a single bit slot; and, a feedback loop with a single bit slot delay for feeding back N bit slots of the gate output stream to the gate switching input to maintain the logical state of the gate output stream.

21. Apparatus according to claim 20, the switching device further comprising an optical combiner, the optical combiner comprising a first combiner input coupled to the switching device switching input; a second combiner input coupled to the gate output via the feedback loop; and, a combiner output connected to the gate switching input, wherein if a bit slot having the same logical state as the switching signal, and a switching signal are received at the first and second combiner inputs at substantially the same time, then no switching signal is output from the combiner output.

22. Apparatus according to claim 20, wherein each of the N fed back bit slots in the gate output stream comprise a single optical pulse in a bit slot.

23. Apparatus according to claim 20, wherein the gate output is coupled to the switching device output such that each of the N optical bit slots contains an optical pulse.

24. Apparatus according to claim 20, the optical gate further comprising a second gate output which generates a second gate output stream which is the logical complement of the gate output stream.

25. Apparatus according to claim 24, wherein the second gate output is coupled to the switching device output such that each of the N optical bit slots contains no optical pulse.

26. An all optical word comparator and a window generator as in claim 18, said word comparator comparing first and second optical binary words, each word being defined as a sequence of M optical bit slots optically representing respective logical states, the apparatus comprising a first comparator word input which receives the first binary word; a second comparator word input which receives the second binary word; a comparator input which receives a stream of optical pulses; a comparator output; and a controller coupled to the first and second comparator word inputs, the comparator input and the comparator output, wherein the controller compares respective bit slots of the two binary words and selectively switches a connection between the comparator input and the comparator output such that the output from the comparator output indicates the relationship between the two binary words; and wherein the window generator for generating a stream of optical pulses, in which the stream of optical pulses defines an optical bit slot window including at least one bit slot containing no optical pulse, the presence of the bit slot window in the stream of optical pulses causing the word comparator to reset.

27. A word comparator according to claim 26, wherein the controller comprises an optical combiner having first and second combiner inputs coupled to the first and the second word inputs respectively, and a combiner output which generates a combined optical signal stream, wherein the combiner combines respective bit slots of the first and second binary words such that the corresponding bit slot of the combined optical signal stream has a first logical state if the respective bit slots are identical and a second complementary logical state if the respective bit slots are different, the logical state of the combined optical signal stream being used to selectively switch the connection between the comparator input and the comparator output.

28. A word comparator according to claim 27, the controller further comprising an all optical non-linear gate the gate comprising a gate input coupled to the comparator input; a gate output, which generates a gate output stream, coupled to the comparator output; and a gate switching input coupled to the combiner output, wherein the application of a switching signal to the gate switching input selectively switches a connection between the gate input and the gate output so as to change the logical state of the gate output stream.

29. A word comparator according to claim 28, wherein the application of a switching signal to the gate switching input causes the gate output stream to change from the second logical state to the first logical state for a time period corresponding to one bit slot.

30. A word comparator according to claim 29, wherein switching signal is an optical bit slot having the second logical state.

31. A word comparator according to claim 27, wherein a bit slot having the second logical state contains a single optical pulse.

32. A word comparator according to claim 28, the controller further comprising an optical regenerative memory which stores one optical bit slot representing a logical state, the memory having a memory word input which receives the one bit slot to be stored, a memory output coupled to the comparator output which outputs a copy of the stored bit slot, and a memory input, coupled to the gate output which receives the gate output stream.

33. A word comparator according to claim 32, wherein the bit slot to be stored has the second logical state and wherein, if the gate output stream contains a bit slot having the first logical state, the memory is reset such that the stored bit slot is replaced by a bit slot having the first logical state.

34. A word comparator according to claim 32, the controller further comprising an optical pulse generator coupled to the memory word input for generating the bit slot to be stored, the bit slot having a single optical pulse.

35. A switching device for switching a stream of optical pulses having the same logical state, the stream having a plurality of bit slots, the switching device having a device input for receiving the stream of optical pulses when in use, a device output for emitting at least some of the received pulses, and a switching input for receiving an optical switching signal, wherein the switching device has a first state in which pulses received at the device input are emitted at the device output, and a second state in which pulses received at the device input are not emitted at the device output, wherein the switching device is configured such that when the stream of optical pulses is being received, applying the switching signal to the switching input when the device is in either one of the first or second states causes the device to change to the other of the first or second states, the device remaining in the same state until a further switching signal is received.

36. A switching device as claimed in claim 35, wherein there is provided a return path connecting the device output to the control input, the return path having a delay line for imposing a delay on optical pulses travelling therethrough, the delay imposed by the delay line corresponding to a single bit slot.

37. A switching device as claimed in claim 36, wherein there is provided XOR gate having a first input, a second input and output, the return path being provided between the output and the first input of the XOR gate, the second input of the XOR gate being coupled to the device input of the switching device, the second XOR gate input and the XOR gate output being respectively coupled to the switching input and output of the switching device.

38. A switching device as claimed in claim 35 wherein the XOR gate includes an all-optical non linear gate having a switching input, the all-optical gate being in a first switching state when no pulses are received at the switching input and when two pulses are received at the switching input, the all optical gate being in a second switching state when a single pulse is received at the switching input.

39. A switching device as claimed in claim 35, wherein the switching device has a further output which generates an output stream which is the logical compliment of the device output.

40. A switching device as claimed in claim 39 wherein the switching device is arranged such that pulses applied to the input are passed to the main output when the gate is in a first switching state, and to the further output when the device is a second switching state, the return path being provided between the main output and the switching input.

41. Apparatus for generating an optical bit-slot window, the window having N bit-slots, each bit-slot having a the same logical state as the other bit-slots in the window, the apparatus comprising a switching device as claimed in claim 35, a pulse stream source for generating a stream of optical pulses is successive bit-slots, and a switching source for generating a first switching signal and a second switching signal each having the same state as the other, the switching source being configured to generate the first and second switching signals subsequently to one another with a time separation corresponding to N bit slots, wherein the pulse stream source is coupled to the device input of the switching device, and the switching source is coupled to the switching input of the switching device.

42. Apparatus as claimed in claim 41 wherein the switching source comprises a pulse source for providing a pulse, a delay line arranged to delay the pulse provided by the pulse source, and an optical combiner arranged to receive a copy of the pulse directly from the pulse source at one input and to receive the delayed pulse at another input, the combiner having an output which is coupled to the switching input of the switching device, the delay line imposing a delay such that the delayed pulse is delayed by a time corresponding to N bit-slots with respect to the directly received pulse.

43. Apparatus as claimed in claim 41, wherein each of the bit-slots in the N bit-slot window contains an optical pulse.

44. Apparatus as claimed in claim 41, wherein each of the bit-slots in the N bit-slot window does not contain an optical pulse.

45. A word comparator comprising a switching device as in claim 35.

46. A separating device comprising a switching device as in claim 35.

47. Parity determining apparatus comprising a switching device as in claim 35.

48. A resettable optical regenerative memory comprising a switching device as in claim 35.

* * * * *